(12) United States Patent
Mathur et al.

(10) Patent No.: US 8,639,709 B2
(45) Date of Patent: Jan. 28, 2014

(54) COMPARING VERY LARGE XML DATA

(75) Inventors: Lokesh Mathur, Jaipur (IN); Roopesh Nair, Mysore (IN); Mugunthan Srinivasan, Hyderabad (IN); Srikrishna Bandi, Hyderabad (IN); Gaurav Gupta, Greater Noida (IN)

(73) Assignee: Oracle International Corporation, Redwood Shores, CA (US)

( * ) Notice: Subject to any disclaimer, the term of this patent is extended or adjusted under 35 U.S.C. 154(b) by 1106 days.

(21) Appl. No.: 12/016,246

(22) Filed: Jan. 18, 2008

(65) Prior Publication Data

US 2009/0187585 A1   Jul. 23, 2009

(51) Int. Cl.
*G06F 7/00* (2006.01)
*G06F 17/30* (2006.01)

(52) U.S. Cl.
CPC ............................ *G06F 17/30389* (2013.01)
USPC ................................................. 707/758

(58) Field of Classification Search
USPC ............... 707/758, 999.001–5, 999.003
See application file for complete search history.

(56) References Cited

U.S. PATENT DOCUMENTS

| | | | |
|---|---|---|---|
| 5,664,173 A * | 9/1997 | Fast | 707/694 |
| 6,519,597 B1 * | 2/2003 | Cheng et al. | 1/1 |
| 6,732,102 B1 * | 5/2004 | Khandekar | 707/999.01 |
| 6,748,393 B1 * | 6/2004 | Kapoor et al. | 1/1 |
| 7,234,109 B2 * | 6/2007 | Atkinson | 715/239 |
| 7,516,229 B2 * | 4/2009 | Trastour et al. | 709/230 |
| 2002/0133484 A1 * | 9/2002 | Chau et al. | 707/3 |
| 2002/0169788 A1 * | 11/2002 | Lee et al. | 707/104.1 |
| 2003/0212664 A1 * | 11/2003 | Breining et al. | 707/3 |
| 2004/0205509 A1 * | 10/2004 | Lou | 715/501.1 |
| 2005/0044063 A1 * | 2/2005 | Barsness et al. | 707/2 |
| 2005/0055351 A1 * | 3/2005 | Barton et al. | 707/10 |
| 2005/0091188 A1 * | 4/2005 | Pal et al. | 707/1 |
| 2005/0228818 A1 * | 10/2005 | Murthy et al. | 707/102 |
| 2006/0036631 A1 * | 2/2006 | Cheslow | 707/101 |
| 2006/0212420 A1 * | 9/2006 | Murthy | 707/1 |
| 2007/0005632 A1 * | 1/2007 | Stefani et al. | 707/102 |
| 2007/0011167 A1 * | 1/2007 | Krishnaprasad et al. | 707/9 |
| 2007/0011184 A1 * | 1/2007 | Morris et al. | 707/101 |
| 2008/0010587 A1 * | 1/2008 | Wake et al. | 715/234 |
| 2008/0082571 A1 * | 4/2008 | Sakai et al. | 707/102 |

* cited by examiner

*Primary Examiner* — Jay Morrison

(74) *Attorney, Agent, or Firm* — Narendra Reddy Thappeta

(57) ABSTRACT

Comparing very large XML data. In one embodiment, a first and second XML data received for comparison are stored in the form of respective multiple rows in a database. A first and second set of rows (respectively corresponding to the first and second XML data) having the same value corresponding to a key are retrieved from the database and examined to form a comparison result. The same operations may be performed for each value of the key (and also other keys) present in either of the XML data sets.

39 Claims, 23 Drawing Sheets

XML Comparator

Generate Comparison Report: Set Report Parameters      Step 1 of 2

- 410 → Name: Payment Terms Comparison
- 415 → Primary Data Source: SrcPaymentTerms.xml [Browse]
- 420 → Secondary Data Source: TargetPaymentTerms.xml [Browse]
- 425 → Downloadable Report Format: PDF ▼

430 [Next]

FIG. 4A

XML Comparator

Generate Comparison Report: Schedule      Step 2 of 2

- 460 → ◉ As soon as possible
- 470 → ○ As scheduled
- 475 → Date: [ ]
- 478 → Time: 12 ▼ : 00 ▼ ◉ AM ○ PM 490 [Back] [Finish]

FIG. 4B

```
501: <?xml version="1.0" encoding="UTF-8" ?>
502: <SetupPaymentTermAM ID="BE" MIN_API_VERSION="115.4">
503: <TermsBVO ID="VIEW">
504:    <TermsBVO>
505:        <Name>Due on 20th</Name>
506:        <CreditCheckFlag>N</CreditCheckFlag>
507:        <DueCutoffDay />
508:        <PrintingLeadDays />
509:        <Description>Billing Cutoff on 20th, Due 20th of Next Month</Description>
510:        <StartDateActive>1995-01-01</StartDateActive>
511:        <EndDateActive />
512:        <BaseAmount>100</BaseAmount>
513:        <CalcDiscountOnLinesFlag>I</CalcDiscountOnLinesFlag>
514:        <FirstInstallmentCode>INCLUDE</FirstInstallmentCode>
515:        <InUse>Y</InUse>
516:        <PartialDiscountFlag>N</PartialDiscountFlag>
517:        <PrepaymentFlag>N</PrepaymentFlag>
518:        <BillingCycleName>Monthly</BillingCycleName>
519:        <TermsLinesVO>
520:            <SequenceNum>1</SequenceNum>
521:            <RelativeAmount>100</RelativeAmount>
522:            <DueDays />
523:            <DueDate />
524:            <DueDayOfMonth>20</DueDayOfMonth>
525:            <DueMonthsForward>1</DueMonthsForward>
526:        </TermsLinesVO>
527:    </TermsBVO>
528:    <TermsBVO>
529:        <Name>NET25</Name>
530:        <CreditCheckFlag>N</CreditCheckFlag>
531:        <DueCutoffDay />
532:        <PrintingLeadDays />
533:        <Description>Net Due in 25 Days</Description>
534:        <StartDateActive>1990-01-01</StartDateActive>
535:        <EndDateActive />
536:        <AttributeCategory />
537:        <BaseAmount>100</BaseAmount>
538:        <CalcDiscountOnLinesFlag>I</CalcDiscountOnLinesFlag>
539:        <FirstInstallmentCode>ALLOCATE</FirstInstallmentCode>
540:        <InUse>N</InUse>
```

FIG. 5A

```
541:    <PartialDiscountFlag>N</PartialDiscountFlag>
542:    <PrepaymentFlag>N</PrepaymentFlag>
543:    <BillingCycleName />
544:    <TermsLinesVO>
545:        <SequenceNum>1</SequenceNum>
546:        <RelativeAmount>100</RelativeAmount>
547:        <DueDays>25</DueDays>
548:        <DueDate />
549:        <DueDayOfMonth />
550:        <DueMonthsForward />
551:    </TermsLinesVO>
552: </TermsBVO>
553: <TermsBVO>
554:    <Name>NET15</Name>
555:    <CreditCheckFlag>N</CreditCheckFlag>
556:    <DueCutoffDay />
557:    <PrintingLeadDays />
558:    <Description>Net Due in 15 Days</Description>
559:    <StartDateActive>1990-01-01</StartDateActive>
560:    <EndDateActive />
561:    <BaseAmount>100</BaseAmount>
562:    <CalcDiscountOnLinesFlag>I</CalcDiscountOnLinesFlag>
563:    <FirstInstallmentCode>ALLOCATE</FirstInstallmentCode>
564:    <InUse>N</InUse>
565:    <PartialDiscountFlag>N</PartialDiscountFlag>
566:    <PrepaymentFlag>N</PrepaymentFlag>
567:    <BillingCycleName />
568:    <TermsLinesVO>
569:        <SequenceNum>1</SequenceNum>
570:        <RelativeAmount>100</RelativeAmount>
571:        <DueDays>15</DueDays>
572:        <DueDate />
573:        <DueDayOfMonth />
574:        <DueMonthsForward />
575:    </TermsLinesVO>
576: </TermsBVO>
577: <TermsBVO>
578:    <Name>90 NET</Name>
579:    <CreditCheckFlag>Y</CreditCheckFlag>
580:    <DueCutoffDay />
```

FIG. 5B

```
581:    <PrintingLeadDays />
582:    <Description>Net due in 90 days.</Description>
583:    <StartDateActive>1990-01-01</StartDateActive>
584:    <EndDateActive />
585:    <BaseAmount>200</BaseAmount>
586:    <CalcDiscountOnLinesFlag>L</CalcDiscountOnLinesFlag>
587:    <FirstInstallmentCode>INCLUDE</FirstInstallmentCode>
588:    <InUse>Y</InUse>
589:    <PartialDiscountFlag>N</PartialDiscountFlag>
590:    <PrepaymentFlag>N</PrepaymentFlag>
591:    <BillingCycleName />
592:    <TermsTIVO>
593:        <Description>Net due in 90 days.</Description>
594:        <Name>90 NET</Name>
595:        <Language>KO</Language>
596:        <SourceLang>US</SourceLang>
597:    </TermsTIVO>
598:    <TermsTIVO>
599:        <Description>Net due in 90 days.</Description>
501A:       <Name>90 NET</Name>
502A:       <Language>US</Language>
503A:       <SourceLang>US</SourceLang>
504A:   </TermsTIVO>
505A:   <TermsLinesVO>
506A:       <SequenceNum>1</SequenceNum>
507A:       <RelativeAmount>100</RelativeAmount>
508A:       <DueDays>90</DueDays>
509A:       <DueDate />
510A:         <DueDayOfMonth />
511A:         <DueMonthsForward />
512A:   </TermsLinesVO>
513A: </TermsBVO>
514A: </TermsBVO>
515A: </SetupPaymentTermAM>
```

FIG. 5C

```
601: <?xml version="1.0" encoding="UTF-8" ?>
602: <SetupPaymentTermAM ID="BE" MIN_API_VERSION="115.4">
603: <TermsBVO ID="VIEW">
604:     <TermsBVO>
605:         <Name>Due on 20th</Name>
606:         <CreditCheckFlag>N</CreditCheckFlag>
607:         <DueCutoffDay />
608:         <PrintingLeadDays />
609:         <Description>Billing Cutoff on 20th, Due 20th of Next Month</Description>
610:         <StartDateActive>1997-01-01</StartDateActive>
611:         <EndDateActive />
612:         <BaseAmount>100</BaseAmount>
613:         <CalcDiscountOnLinesFlag>I</CalcDiscountOnLinesFlag>
614:         <FirstInstallmentCode>INCLUDE</FirstInstallmentCode>
615:         <InUse>Y</InUse>
616:         <PartialDiscountFlag>N</PartialDiscountFlag>
617:         <PrepaymentFlag>N</PrepaymentFlag>
618:         <BillingCycleName>Monthly</BillingCycleName>
619:         <TermsLinesVO>
620:             <SequenceNum>1</SequenceNum>
621:             <RelativeAmount>100</RelativeAmount>
622:             <DueDays />
623:             <DueDate />
624:             <DueDayOfMonth>20</DueDayOfMonth>
625:             <DueMonthsForward>1</DueMonthsForward>
626:         </TermsLinesVO>
627:     </TermsBVO>
628:     <TermsBVO>
629:         <Name>NET15</Name>
630:         <CreditCheckFlag>N</CreditCheckFlag>
631:         <DueCutoffDay />
632:         <PrintingLeadDays />
633:         <Description>Net Due in 15 Days</Description>
634:         <StartDateActive>1990-01-01</StartDateActive>
635:         <EndDateActive />
636:         <BaseAmount>100</BaseAmount>
637:         <CalcDiscountOnLinesFlag>I</CalcDiscountOnLinesFlag>
638:         <FirstInstallmentCode>ALLOCATE</FirstInstallmentCode>
639:         <InUse>N</InUse>
640:         <PartialDiscountFlag>N</PartialDiscountFlag>
```

FIG. 6A

```
641:    <PrepaymentFlag>N</PrepaymentFlag>
642:    <BillingCycleName />
643:    <TermsLinesVO>
644:        <SequenceNum>1</SequenceNum>
645:        <RelativeAmount>100</RelativeAmount>
646:        <DueDays>15</DueDays>
647:        <DueDate />
648:        <DueDayOfMonth />
649:        <DueMonthsForward />
650:    </TermsLinesVO>
651: </TermsBVO>
652: <TermsBVO>
653:    <Name>NET5</Name>
654:    <CreditCheckFlag>N</CreditCheckFlag>
655:    <DueCutoffDay />
656:    <PrintingLeadDays />
657:    <Description>Net Due in 5 Days</Description>
658:    <StartDateActive>1990-01-01</StartDateActive>
659:    <EndDateActive />
660:    <BaseAmount>100</BaseAmount>
661:    <CalcDiscountOnLinesFlag>I</CalcDiscountOnLinesFlag>
662:    <FirstInstallmentCode>ALLOCATE</FirstInstallmentCode>
663:    <InUse>N</InUse>
664:    <PartialDiscountFlag>N</PartialDiscountFlag>
665:    <PrepaymentFlag>N</PrepaymentFlag>
666:    <BillingCycleName />
667:    <TermsLinesVO>
668:        <SequenceNum>1</SequenceNum>
669:        <RelativeAmount>100</RelativeAmount>
670:        <DueDays>5</DueDays>
671:        <DueDate />
672:        <DueDayOfMonth />
673:        <DueMonthsForward />
674:    </TermsLinesVO>
675: </TermsBVO>
```

*FIG. 6B*

```
676:    <TermsBVO>
677:        <Name>90 NET</Name>
678:        <CreditCheckFlag>Y</CreditCheckFlag>
679:        <DueCutoffDay />
680:        <PrintingLeadDays />
681:        <Description>Net due in 90 days.</Description>
682:        <StartDateActive>1990-01-01</StartDateActive>
683:        <EndDateActive />
684:        <BaseAmount>100</BaseAmount>
685:        <CalcDiscountOnLinesFlag>L</CalcDiscountOnLinesFlag>
686:        <FirstInstallmentCode>INCLUDE</FirstInstallmentCode>
687:        <InUse>Y</InUse>
688:        <PartialDiscountFlag>N</PartialDiscountFlag>
689:        <PrepaymentFlag>N</PrepaymentFlag>
690:        <BillingCycleName />
691:        <TermsTIVO>
692:            <Description>Net due in 90 days.</Description>
693:            <Name>90 NET</Name>
694:            <Language>KO</Language>
695:            <SourceLang>US</SourceLang>
696:        </TermsTIVO>
697:        <TermsTIVO>
698:            <Description>Net due in 90 days.</Description>
699:            <Name>90 NET</Name>
601A:           <Language>US</Language>
602A:           <SourceLang>US</SourceLang>
603A:       </TermsTIVO>
604A:       <TermsLinesVO>
605A:           <SequenceNum>1</SequenceNum>
606A:           <RelativeAmount>100</RelativeAmount>
607A:           <DueDays>90</DueDays>
608A:           <DueDate />
609A:           <DueDayOfMonth />
610A:           <DueMonthsForward />
611A:       </TermsLinesVO>
612A:   </TermsBVO>
613A: </TermsBVO>
614A: </SetupPaymentTermAM>
```

FIG. 6C

721: # All keys for a given record/element are specified as comma-separated values
722: TermsBVO = Name

FIG. 7

```
801: <?xml version="1.0" encoding="UTF-8" ?>
802: <EXT primary="true" req_id="1234" source="Payment Terms">
803:    <H DP="1">
804:       <T>-1</T> <ID>1</ID> <PID>0</PID>
805:       <HC>-1977287214</HC>  <HD>1SetupPaymentTermAM</HD>
806:       <S>Payment Terms</S>  <N>SetupPaymentTermAM</N> <D>Setup Payment Term</D>
807:    </H>
808:    <H DP="3">
809:       <T>0</T> <ID>3</ID> <PID>1</PID>
810:       <HC>-1993028299</HC>  <HD>3TermsBVONameDue on 20th</HD>
811:       <S>Payment Terms</S> <N>TermsBVO</N> <D>Terms B</D>
812:       <V N="Name" D="Term Name" U="Y">Due on 20th</V>
813:       <V N="CreditCheckFlag" D="Credit Check Flag">N</V>
814:       <V N="Description" D="Description">Billing Cutoff on 20th, Due 20th of Next Month</V>
815:       <V N="StartDateActive" D="Start Date Active">1995-01-01</V>
816:       <V N="BaseAmount" D="Base Amount">100</V>
817:       <V N="CalcDiscountOnLinesFlag" D="Calc Discount On Lines Flag">I</V>
818:       <V N="FirstInstallmentCode" D="First Installment Code">INCLUDE</V>
819:       <V N="InUse" D="In Use">Y</V>
820:       <V N="PartialDiscountFlag" D="Partial Discount Flag">N</V>
821:       <V N="PrepaymentFlag" D="Prepayment Flag">N</V>
822:       <V N="BillingCycleName" D="Billing Cycle Name">Monthly</V>
823:    </H>
```

FIG. 8A

```
824:    <H DP="4">
825:        <T>0</T>  <ID>5</ID>  <PID>3</PID>
826:        <HC>-1968680399</HC>  <HD>4TermsLinesVOSequenceNum1</HD>
827:        <S>Payment Terms</S>  <N>TermsLinesVO</N>  <D>Terms Lines</D>
828:        <V N="SequenceNum" D="Term Name" U="Y">1</V>
829:        <V N="RelativeAmount" D="Relative Amount">100</V>
830:        <V N="DueDayOfMonth" D="Due Day Of Month">20</V>
831:        <V N="DueMonthsForward" D="Due Months Forward">1</V>
832:    </H>
833:    <H DP="3">
834:        <T>0</T>  <ID>7</ID>  <PID>1</PID>
835:        <HC>379348910</HC>  <HD>3TermsBVONameNET25</HD>
836:        <S>Payment Terms</S>  <N>TermsBVO</N>  <D>Terms B</D>
837:        <V N="Name" D="Term Name" U="Y">NET25</V>
838:        <V N="CreditCheckFlag" D="Credit Check Flag">N</V>
839:        <V N="Description" D="Description">Net Due in 25 Days</V>
840:        <V N="StartDateActive" D="Start Date Active">1990-01-01</V>
841:        <V N="BaseAmount" D="Base Amount">100</V>
842:        <V N="CalcDiscountOnLinesFlag" D="Calc Discount On Lines Flag">I</V>
843:        <V N="FirstInstallmentCode" D="First Installment Code">ALLOCATE</V>
844:        <V N="InUse" D="In Use">N</V>
845:        <V N="PartialDiscountFlag" D="Partial Discount Flag">N</V>
846:        <V N="PrepaymentFlag" D="Prepayment Flag">N</V>
847:    </H>
848:    <H DP="4">
849:        <T>0</T>  <ID>9</ID>  <PID>7</PID>
850:        <HC>-1968680399</HC>  <HD>4TermsLinesVOSequenceNum1</HD>
851:        <S>Payment Terms</S>  <N>TermsLinesVO</N>  <D>Terms Lines</D>
852:        <V N="SequenceNum" D="Term Name" U="Y">1</V>
853:        <V N="RelativeAmount" D="Relative Amount">100</V>
854:        <V N="DueDays" D="Due Days">25</V>
855:    </H>
```

*FIG. 8B*

```
856:    <H DP="3">
857:        <T>0</T>  <ID>11</ID>  <PID>1</PID>
858:        <HC>379348879</HC>  <HD>3TermsBVONameNET15</HD>
859:        <S>Payment Terms</S>  <N>TermsBVO</N>  <D>Terms B</D>
860:        <V N="Name" D="Term Name" U="Y">NET15</V>
861:        <V N="CreditCheckFlag" D="Credit Check Flag">N</V>
862:        <V N="Description" D="Description">Net Due in 15 Days</V>
863:        <V N="StartDateActive" D="Start Date Active">1990-01-01</V>
864:        <V N="BaseAmount" D="Base Amount">100</V>
865:        <V N="CalcDiscountOnLinesFlag" D="Calc Discount On Lines Flag">I</V>
866:        <V N="FirstInstallmentCode" D="First Installment Code">ALLOCATE</V>
867:        <V N="InUse" D="In Use">N</V>
868:        <V N="PartialDiscountFlag" D="Partial Discount Flag">N</V>
869:        <V N="PrepaymentFlag" D="Prepayment Flag">N</V>
870:    </H>
871:    <H DP="4">
872:        <T>0</T>  <ID>13</ID>  <PID>11</PID>
873:        <HC>-1968680399</HC>  <HD>4TermsLinesVOSequenceNum1</HD>
874:        <S>Payment Terms</S>  <N>TermsLinesVO</N>  <D>Terms Lines</D>
875:        <V N="SequenceNum" D="Term Name" U="Y">1</V>
876:        <V N="RelativeAmount" D="Relative Amount">100</V>
877:        <V N="DueDays" D="Due Days">15</V>
878:    </H>
879:    <H DP="3">
880:        <T>0</T>  <ID>15</ID>  <PID>1</PID>
881:        <HC>-1747213434</HC>  <HD>3TermsBVOName90 NET</HD>
882:        <S>Payment Terms</S>  <N>TermsBVO</N>  <D>Terms B</D>
883:        <V N="Name" D="Term Name" U="Y">90 NET</V>
884:        <V N="CreditCheckFlag" D="Credit Check Flag">Y</V>
885:        <V N="Description" D="Description">Net due in 90 days.</V>
886:        <V N="StartDateActive" D="Start Date Active">1990-01-01</V>
887:        <V N="BaseAmount" D="Base Amount">200</V>
888:        <V N="CalcDiscountOnLinesFlag" D="Calc Discount On Lines Flag">L</V>
```

FIG. 8C

```
889:        <V N="FirstInstallmentCode" D="First Installment Code">INCLUDE</V>
890:        <V N="InUse" D="In Use">Y</V>
891:        <V N="PartialDiscountFlag" D="Partial Discount Flag">N</V>
892:        <V N="PrepaymentFlag" D="Prepayment Flag">N</V>
893:     </H>
894:     <H DP="4">
895:        <T>0</T>  <ID>17</ID>  <PID>15</PID>
896:        <HC>2087820393</HC>  <HD>4TermsTIVO</HD>
897:        <S>Payment Terms</S>  <N>TermsTIVO</N>  <D>Terms TI</D>
898:        <V N="Description" D="Description">Net due in 90 days.</V>
899:        <V N="Name" D="Name">90 NET</V>
801A:       <V N="Language" D="Language">KO</V>
802A:       <V N="SourceLang" D="Source Lang">US</V>
803A:    </H>
804A:    <H DP="4">
805A:       <T>0</T>  <ID>19</ID>  <PID>15</PID>
806A:       <HC>-1556144049</HC>  <HD>4TermsTIVO</HD>
807A:       <S>Payment Terms</S>  <N>TermsTIVO</N>  <D>Terms TI</D>
808A:       <V N="Description" D="Description">Net due in 90 days.</V>
809A:       <V N="Name" D="Name">90 NET</V>
810A:       <V N="Language" D="Language">US</V>
811A:       <V N="SourceLang" D="Source Lang">US</V>
812A:    </H>
813A:    <H DP="4">
814A:       <T>0</T>  <ID>21</ID>  <PID>15</PID>
815A:       <HC>-1968680399</HC>  <HD>4TermsLinesVOSequenceNum1</HD>
816A:       <S>Payment Terms</S>  <N>TermsLinesVO</N>  <D>Terms Lines</D>
817A:       <V N="SequenceNum" D="Term Name" U="Y">1</V>
818A:       <V N="RelativeAmount" D="Relative Amount">100</V>
819A:       <V N="DueDays" D="Due Days">90</V>
820A:    </H>
821A: </EXT>
```

*FIG. 8D*

| | NAME | DISPLAY_NAME | REQUEST_ID | SOURCE | TYPE | ID | PARENT_ID | HASHCODE | HASHCODE_DETAILS |
|---|---|---|---|---|---|---|---|---|---|
| 951→ | SetupPaymentTermAM | Setup Payment Term | 1234 | Payment_Terms | -1 | 1 | 0 | -1977287214 | 1SetupPaymentTermAM |
| 952→ | SetupPaymentTermAM | Setup Payment Term | 1234 | Payment_Terms | -1 | 1 | 0 | -1977287214 | 1SetupPaymentTermAM |
| 953→ | TermsBVO | Terms B | 1234 | Payment_Terms | 0 | 3 | 1 | -1993028299 | 3TermsBVONameDue on 20th |
| 954→ | TermsBVO | Terms B | 1234 | Payment_Terms | 0 | 3 | 1 | -1993028299 | 3TermsBVONameDue on 20th |
| 955→ | TermsBVO | Terms B | 1234 | Payment_Terms | 0 | 7 | 1 | 379348910 | 3TermsBVONameNET25 |
| 956→ | TermsBVO | Terms B | 1234 | Payment_Terms | 0 | 7 | 1 | 379348879 | 3TermsBVONameNET15 |
| 957→ | TermsBVO | Terms B | 1234 | Payment_Terms | 0 | 11 | 1 | 379348879 | 3TermsBVONameNET15 |
| 958→ | TermsBVO | Terms B | 1234 | Payment_Terms | 0 | 11 | 1 | -957594262 | 3TermsBVONameNET5 |
| 958→ | TermsBVO | Terms B | 1234 | Payment_Terms | 0 | 15 | 1 | -1747213434 | 3TermsBVOName90 NET |
| 960→ | TermsBVO | Terms B | 1234 | Payment_Terms | 0 | 15 | 1 | -1747213434 | 3TermsBVOName90 NET |
| 961→ | TermsLinesVO | Terms Lines | 1234 | Payment_Terms | 2 | 5 | 3 | -1968680399 | 4TermsLinesVOSequenceNum1 |
| 962→ | TermsLinesVO | Terms Lines | 1234 | Payment_Terms | 2 | 5 | 3 | -1968680399 | 4TermsLinesVOSequenceNum1 |
| 963→ | TermsLinesVO | Terms Lines | 1234 | Payment_Terms | 2 | 9 | 7 | -1968680399 | 4TermsLinesVOSequenceNum1 |
| 964→ | TermsLinesVO | Terms Lines | 1234 | Payment_Terms | 2 | 9 | 7 | -1968680399 | 4TermsLinesVOSequenceNum1 |
| 965→ | TermsLinesVO | Terms Lines | 1234 | Payment_Terms | 2 | 13 | 11 | -1968680399 | 4TermsLinesVOSequenceNum1 |
| 966→ | TermsLinesVO | Terms Lines | 1234 | Payment_Terms | 2 | 13 | 11 | -1968680399 | 4TermsLinesVOSequenceNum1 |
| 967→ | TermsTIVO | Terms TI | 1234 | Payment_Terms | 2 | 17 | 15 | 2087820393 | 4TermsTIVO |
| 968→ | TermsTIVO | Terms TI | 1234 | Payment_Terms | 2 | 17 | 15 | 2087820393 | 4TermsTIVO |
| 969→ | TermsTIVO | Terms TI | 1234 | Payment_Terms | 2 | 19 | 15 | -1556144049 | 4TermsTIVO |
| 970→ | TermsTIVO | Terms TI | 1234 | Payment_Terms | 2 | 19 | 15 | -1556144049 | 4TermsTIVO |
| 971→ | TermsLinesVO | Terms Lines | 1234 | Payment_Terms | 2 | 21 | 15 | -1968680399 | 4TermsLinesVOSequenceNum1 |
| 972→ | TermsLinesVO | Terms Lines | 1234 | Payment_Terms | 2 | 21 | 15 | -1968680399 | 4TermsLinesVOSequenceNum1 |

*FIG. 9A*

| | MATCHED _FLAG | IS_ PRIMARY | DEPTH | ATTRIBUTES |
|---|---|---|---|---|
| 951→ | N | Y | 1 | <H></H> |
| 952→ | N | N | 1 | <H></H> |
| 953→ | N | Y | 3 | <H><V N='Name' D='Term Name' U='Y'><A>Due on 20th</A></V><V N='CreditCheckFlag' D='Credit Check Flag'><A>N</A></V><V N='Description' D='Description'><A>Billing Cutoff on 20th, Due 20th of Next Month</A></V><V N='StartDateActive' D='Start Date Active'><A>1995-01-01</A></V><V N='BaseAmount' D='Base Amount'><A>100</A></V><V N='CalcDiscountOnLinesFlag' D='Calc Discount On Lines Flag'><A>I</A></V><V N='FirstInstallmentCode' D='First Installment Code'><A>INCLUDE</A></V><V N='InUse' D='In Use'><A>Y</A></V><V N='PartialDiscountFlag' D='Partial Discount Flag'><A>N</A></V><V N='PrepaymentFlag' D='Prepayment Flag'><A>N</A></V><V N='BillingCycleName' D='Billing Cycle Name'><A>Monthly</A></V></H> |
| 954→ | N | N | 3 | <H><V N='Name' D='Term Name' U='Y'><B>Due on 20th</B></V><V N='CreditCheckFlag' D='Credit Check Flag'><B>N</B></V><V N='Description' D='Description'><B>Billing Cutoff on 20th, Due 20th of Next Month</B></V><V N='StartDateActive' D='Start Date Active'><B>1997-01-01</B></V><V N='BaseAmount' D='Base Amount'><B>100</B></V><V N='CalcDiscountOnLinesFlag' D='Calc Discount On Lines Flag'><B>I</B></V><V N='FirstInstallmentCode' D='First Installment Code'><B>INCLUDE</B></V><V N='InUse' D='In Use'><B>Y</B></V><V N='PartialDiscountFlag' D='Partial Discount Flag'><B>N</B></V><V N='PrepaymentFlag' D='Prepayment Flag'><B>N</B></V><V N='BillingCycleName' D='Billing Cycle Name'><B>Monthly</B></V></H> |
| 955→ | N | Y | 3 | <H><V N='Name' D='Term Name' U='Y'><A>NET25</A></V><V N='CreditCheckFlag' D='Credit Check Flag'><A>N</A></V><V N='Description' D='Description'><A>Net Due in 25 Days</A></V><V N='StartDateActive' D='Start Date Active'><A>1990-01-01</A></V><V N='BaseAmount' D='Base Amount'><A>100</A></V><V N='CalcDiscountOnLinesFlag' D='Calc Discount On Lines Flag'><A>I</A></V><V N='FirstInstallmentCode' D='First Installment Code'><A>ALLOCATE</A></V><V N='InUse' D='In Use'><A>N</A></V><V N='PartialDiscountFlag' D='Partial Discount Flag'><A>N</A></V><V N='PrepaymentFlag' D='Prepayment Flag'><A>N</A></V></H> |
| 956→ | N | N | 3 | <H><V N='Name' D='Term Name' U='Y'><B>NET15</B></V><V N='CreditCheckFlag' D='Credit Check Flag'><B>N</B></V><V N='Description' D='Description'><B>Net Due in 15 Days</B></V><V N='StartDateActive' D='Start Date Active'><B>1990-01-01</B></V><V N='BaseAmount' D='Base Amount'><B>100</B></V><V N='CalcDiscountOnLinesFlag' D='Calc Discount On Lines Flag'><B>I</B></V><V N='FirstInstallmentCode' D='First Installment Code'><B>ALLOCATE</B></V><V N='InUse' D='In Use'><B>N</B></V><V N='PartialDiscountFlag' D='Partial Discount Flag'><B>N</B></V><V N='PrepaymentFlag' D='Prepayment Flag'><B>N</B></V></H> |
| 957→ | N | Y | 3 | <H><V N='Name' D='Term Name' U='Y'><A>NET15</A></V><V N='CreditCheckFlag' D='Credit Check Flag'><A>N</A></V><V N='Description' D='Description'><A>Net Due in 15 Days</A></V><V N='StartDateActive' D='Start Date Active'><A>1990-01-01</A></V><V N='BaseAmount' D='Base Amount'><A>100</A></V><V N='CalcDiscountOnLinesFlag' D='Calc Discount On Lines Flag'><A>I</A></V><V N='FirstInstallmentCode' D='First Installment Code'><A>ALLOCATE</A></V><V N='InUse' D='In Use'><A>N</A></V><V N='PartialDiscountFlag' D='Partial Discount Flag'><A>N</A></V><V N='PrepaymentFlag' D='Prepayment Flag'><A>N</A></V></H> |

*FIG. 9B*

| | MATCHED _FLAG (930) | IS_ PRIMARY (931) | DEPTH (932) | ATTRIBUTES (933) |
|---|---|---|---|---|
| 958→ | N | N | 3 | <H ><V N='Name' D='Term Name' U='Y'><B>NET5</B></V><V N='CreditCheckFlag' D='Credit Check Flag'><B>N</B></V><V N='Description' D='Description'><B>Net Due in 5 Days</B></V><V N='StartDateActive' D='Start Date Active'><B>1990-01-01</B></V><V N='BaseAmount' D='Base Amount'><B>100</B></V><V N='CalcDiscountOnLinesFlag' D='Calc Discount On Lines Flag'><B>I</B></V><V N='FirstInstallmentCode' D='First Installment Code'><B>ALLOCATE</B></V><V N='InUse' D='In Use'><B>N</B></V><V N='PartialDiscountFlag' D='Partial Discount Flag'><B>N</B></V><V N='PrepaymentFlag' D='Prepayment Flag'><B>N</B></V></H> |
| 959→ | N | Y | 3 | <H ><V N='Name' D='Term Name' U='Y'><A>90 NET</A></V><V N='CreditCheckFlag' D='Credit Check Flag'><A>Y</A></V><V N='Description' D='Description'><A>Net due in 90 days.</A></V><V N='StartDateActive' D='Start Date Active'><A>1990-01-01</A></V><V N='BaseAmount' D='Base Amount'><A>200</A></V><V N='CalcDiscountOnLinesFlag' D='Calc Discount On Lines Flag'><A>L</A></V><V N='FirstInstallmentCode' D='First Installment Code'><A>INCLUDE</A></V><V N='InUse' D='In Use'><A>Y</A></V><V N='PartialDiscountFlag' D='Partial Discount Flag'><A>N</A></V><V N='PrepaymentFlag' D='Prepayment Flag'><A>N</A></V></H> |
| 960→ | N | N | 3 | <H ><V N='Name' D='Term Name' U='Y'><B>90 NET</B></V><V N='CreditCheckFlag' D='Credit Check Flag'><B>Y</B></V><V N='Description' D='Description'><B>Net due in 90 days.</B></V><V N='StartDateActive' D='Start Date Active'><B>1990-01-01</B></V><V N='BaseAmount' D='Base Amount'><B>100</B></V><V N='CalcDiscountOnLinesFlag' D='Calc Discount On Lines Flag'><B>L</B></V><V N='FirstInstallmentCode' D='First Installment Code'><B>INCLUDE</B></V><V N='InUse' D='In Use'><B>Y</B></V><V N='PartialDiscountFlag' D='Partial Discount Flag'><B>N</B></V><V N='PrepaymentFlag' D='Prepayment Flag'><B>N</B></V></H> |
| 961→ | N | Y | 4 | <H ><V N='SequenceNum' D='Term Name' U='Y'><A>1</A></V><V N='RelativeAmount' D='Relative Amount'><A>100</A></V><V N='DueDayOfMonth' D='Due Day Of Month'><A>20</A></V><V N='DueMonthsForward' D='Due Months Forward'><A>1</A></V></H> |
| 962→ | N | N | 4 | <H ><V N='SequenceNum' D='Term Name' U='Y'><B>1</B></V><V N='RelativeAmount' D='Relative Amount'><B>100</B></V><V N='DueDayOfMonth' D='Due Day Of Month'><B>20</B></V><V N='DueMonthsForward' D='Due Months Forward'><B>1</B></V></H> |
| 963→ | N | Y | 4 | <H ><V N='SequenceNum' D='Term Name' U='Y'><A>1</A></V><V N='RelativeAmount' D='Relative Amount'><A>100</A></V><V N='DueDays' D='Due Days'><A>25</A></V></H> |
| 964→ | N | N | 4 | <H ><V N='SequenceNum' D='Term Name' U='Y'><B>1</B></V><V N='RelativeAmount' D='Relative Amount'><B>100</B></V><V N='DueDays' D='Due Days'><B>15</B></V></H> |

*FIG. 9C*

| | MATCHED_FLAG 930 | IS_PRIMARY 931 | DEPTH 932 | ATTRIBUTES 933 |
|---|---|---|---|---|
| 965→ | N | Y | 4 | <H ><V N='SequenceNum' D='Term Name' U='Y'><A>1</A></V><V N='RelativeAmount' D='Relative Amount'><A>100</A></V><V N='DueDays' D='Due Days'><A>15</A></V></H> |
| 966→ | N | N | 4 | <H ><V N='SequenceNum' D='Term Name' U='Y'><B>1</B></V><V N='RelativeAmount' D='Relative Amount'><B>100</B></V><V N='DueDays' D='Due Days'><B>5</B></V></H> |
| 967→ | N | Y | 4 | <H ><V N='Description' D='Description'><A>Net due in 90 days.</A></V><V N='Name' D='Name'><A>90 NET</A></V><V N='Language' D='Language'><A>KO</A></V><V N='SourceLang' D='Source Lang'><A>US</A></V></H> |
| 968→ | N | N | 4 | <H ><V N='Description' D='Description'><B>Net due in 90 days.</B></V><V N='Name' D='Name'><B>90 NET</B></V><V N='Language' D='Language'><B>KO</B></V><V N='SourceLang' D='Source Lang'><B>US</B></V></H> |
| 969→ | N | Y | 4 | <H ><V N='Description' D='Description'><A>Net due in 90 days.</A></V><V N='Name' D='Name'><A>90 NET</A></V><V N='Language' D='Language'><A>US</A></V><V N='SourceLang' D='Source Lang'><A>US</A></V></H> |
| 970→ | N | N | 4 | <H ><V N='Description' D='Description'><B>Net due in 90 days.</B></V><V N='Name' D='Name'><B>90 NET</B></V><V N='Language' D='Language'><B>US</B></V><V N='SourceLang' D='Source Lang'><B>US</B></V></H> |
| 971→ | N | Y | 4 | <H ><V N='SequenceNum' D='Term Name' U='Y'><A>1</A></V><V N='RelativeAmount' D='Relative Amount'><A>100</A></V><V N='DueDays' D='Due Days'><A>90</A></V></H> |
| 972→ | N | N | 4 | <H ><V N='SequenceNum' D='Term Name' U='Y'><B>1</B></V><V N='RelativeAmount' D='Relative Amount'><B>100</B></V><V N='DueDays' D='Due Days'><B>90</B></V></H> |

*FIG. 9D*

```
1011: SELECT  id
1012: FROM    az_reporter_data
1013: WHERE   request_id = 1234 AND source = 'Payment_Terms' AND
1014:         hashcode = -1993028299 AND parent_id = 1 AND
1015:         is_primary = 'N' AND matched_flag = 'N'
```

*FIG. 10A*

```
1021: SELECT  decode(existsnode((sec.attributes.EXTRACT('/').transform(xmltype(dbms_xmlgen.
1022:         CONVERT(prim.attributes.EXTRACT('/').transform(xmltype.createxml('
1023:         <xsl:stylesheet version="1.0" xmlns:xsl="http://www.w3.org/1999/XSL/Transform">
1024:         <xsl:template match="/H">
1025:            <xsl:stylesheet version="1.0" xmlns:xsl="http://www.w3.org/1999/XSL/Transform">
1026:            <xsl:template match="/H">
1027:            <H>
1028:            <xsl:for-each select="V">
1029:               <xsl:element name="V">
1030:                  <xsl:attribute name="N"><xsl:value-of select="@N" /></xsl:attribute>
1031:                  <xsl:if test="@U=""Y""><xsl:attribute name="U"><xsl:value-of select="@U" /></xsl:attribute></xsl:if >
1032:                  <xsl:choose>
1033:                     <xsl:when test="@A1">
1034:                        <xsl:attribute name="D"><xsl:value-of select="@D" /><xsl:value-of select="@A1" /></xsl:attribute>
1035:                        <xsl:attribute name="A1"><xsl:value-of select="@A1" /></xsl:attribute>
1036:                     </xsl:when>
1037:                     <xsl:otherwise>
1038:                        <xsl:attribute name="D"><xsl:value-of select="@D" /></xsl:attribute>
1039:                     </xsl:otherwise>
1040:                  </xsl:choose>
1041:                  <A>
1042:                     <xsl:text disable-output-escaping="yes">
1043:                        <![CDATA[</xsl:text><xsl:apply-templates select="A"/><xsl:text disable-output-escaping="yes">]]>
1044:                     </xsl:text>
1045:                  </A>
```

*FIG. 10B*

```
1046:                    <xsl:choose>
1047:                        <xsl:when test="@A1">
1048:                            <xsl:copy-of select="V[@N=''<xsl:value-of select="@N" />''and @A1=''<xsl:value-of select="@A1" />'']/B"/>
1049:                        </xsl:when>
1050:                        <xsl:otherwise>
1051:                            <xsl:copy-of select="V[@N=''<xsl:value-of select="@N" />'']/B"/>
1052:                        </xsl:otherwise>
1053:                    </xsl:choose>
1054:                </xsl:element>
1055:            </xsl:for-each>
1056:            <xsl:for-each select="V">
1057:                <xsl:choose> <xsl:apply-templates/> <xsl:otherwise> <xsl:copy-of select="."/> </xsl:otherwise></xsl:choose>
1058:            </xsl:for-each>
1059:            </H>
1060:        </xsl:template>
1061:    </xsl:stylesheet>
1062:        </xsl:template>
1063:        <xsl:template match="V">
1064:            <xsl:when test="@N=''<xsl:value-of select="@N" />''"></xsl:when>
1065:        </xsl:template>
1066:    </xsl:stylesheet>')).getclobval()))).createschemabasedxml('http://ww.acme.com/05/diff.xsd')),
1067:        '/H/V[./A/text()!=./B/text() and not(@U="Y")]'), 1, 'C', 'N') INTO v_is_different
1068: FROM   az_reporter_data prim, az_reporter_data sec
1069: WHERE  prim.request_id = 1234 AND prim.source = 'Payment_Terms' AND
1070:        prim.id = 3 AND prim.is_primary = 'Y' AND
1071:        sec.request_id = 1234 AND sec.source = 'Payment_Terms' AND
1072:        sec.id = 3 AND sec.is_primary = 'N'
```

*FIG. 10C*

Acme Setup          Payment Terms          Report Date Jan 7, 2008

Legend

| <= | Exclusive to Primary | ~= | Present in both, differs in attributes or nested records |
|---|---|---|---|
| => | Exclusive to Secondary | != | Attribute different |

| Name | Primary Value | | Secondary Value |
|---|---|---|---|
| Terms B | | ~= | |
| Payment Term Name | Due on 20th | | Due on 20th |
| Credit Check Flag | N | | N |
| Description | Billing cutoff on 20th. Due 20th of nexr Month | | Billing cutoff on 20th. Due 20th of nexr Month |
| Start Date Active | 1996-01-01 | != | 1997-01-01 |
| Base Amount | 100 | | 100 |
| Calc Discount On Lines Flag | 1 | | 1 |
| First Installment Code | INCLUDE | | INCLUDE |
| In Use | Y | | Y |
| Partial Discount Flag | N | | N |
| Prepayment Flag | N | | N |
| Biling Cycle Name | Monthly | | Monthly |
|    Terms Lines | | | |
|       Sequence Num | 1 | | 1 |
|       Relative Amount | 100 | | 100 |
|       Due Date of Month | 20 | | 20 |
|       Due Months Forward | 1 | | 1 |
| Terms B | | <= | |
| Payment Term Name | NET25 | | |
| Credit Check Flag | N | | |
| Description | Net Due in 25 Days | | |
| Start Date Active | 1990-01-01 | | |
| Base Amount | 100 | | |
| Calc Discount On Lines Flag | 1 | | |
| First Installment Code | | | |

*FIG. 11A*

Acme Setup - Payment Terms ← 1150

Legend
- ← Exclusive to Primary
- → Exclusive to Secondary
- ✓ Present in both, differs in attributes or nested records
- ≠ Attribute different

1160

Search

Payment Term Name [        ] ( Go )

☑ Show only Differences

1170

| Focus Name | Differerent | Value in Primary | Value in Secondary | |
|---|---|---|---|---|
| ⊟ All Payment Terms | | | | ← 1191 |
| ⊞ Terms B | ← | | | ← 1192 |
| ⊞ Terms B | → | | | |
| ⊟ Terms B | ✓ | | | |
|    Payment Term Name | | 90 NET | 90 NET | |
|   ⊟ Details | ≠ | | | ← 1193 |
|     Base Amount | ≠ | 200 | 100 | ← 1194 |
|     Description | | Net due in 90 days | Net due in 90 days | |
|     Start Date Active | | 1990-01-01 | 1990-01-01 | |
|     Prepayment Flag | | N | N | |
|     First Installment Code | | INCLUDE | INCLUDE | |
|     In Use | | Y | Y | |
|     Partial Discount Flag | | N | N | |
|     Credit Check Flag | | Y | Y | |
|     Calc Discount on Lines Flag | | L | L | |

COMPARING VERY LARGE XML DATA

RELATED APPLICATION

The present application is related to the co-pending U.S. patent application entitled, "Enabling Users To Edit Very Large XML Data", Ser. No. 12/016,205, Filed on Jan. 18, 2008, naming the same inventors as in the subject patent application.

BACKGROUND

1. Technical Field

The present disclosure relates to data processing systems and more specifically to comparing of very large XML data.

2. Related Art

XML (eXtensible Markup Language) refers to a language/specification used for describing information/data. XML enables users to specify desired characteristics of the data being described in the form of associated elements (typically containing corresponding start and end tags) and/or attributes. Thus, XML data generally contains elements (or attributes) set equal to corresponding desired data values to describe the data.

The user may specify any desired elements and attributes (and combination thereof) for describing the data. Such a feature is in sharp contrast to other markup languages such as HTML (hypertext markup language), where the elements/attributes are generally pre-defined, and a user is enabled only to associate the data being described with the desired pre-defined elements/attributes.

There is often a need to compare XML data, for example, to determine whether two versions/copies of an XML data are matching with each other. At least due to factors such as optional elements/attributes, absence of set limits on the number of levels of indention, the amount of data that may be associated with individual elements/attributes, challenges are presented in comparing XML data.

The challenges are compounded as the size of the XML data becomes very large.

BRIEF DESCRIPTION OF THE DRAWINGS

Example embodiments of the present invention are described with reference to the accompanying drawings briefly described below.

FIGS. 4A-4B together depicts a user interface which enables users to send requests for comparison of very large XML data in one embodiment.

FIGS. 5A-5C and 6A-6C together respectively depicts sample portions of a first and a second very large XML data sought to be compared in one embodiment.

FIG. 7 depicts a portion of a metadata specifying the keys based on which a first and a second very large XML data are sought to be compared in one embodiment.

FIGS. 8A-8D together depicts a portion of a generic XML data generated corresponding to a (first) very large XML data in one embodiment.

FIGS. 9A-9D together depicts a portion of a tabular data created corresponding to a first and a second very large XML data received for comparison in one embodiment.

FIG. 10A depicts a query used to retrieve rows having a specific value corresponding to a key in one embodiment.

FIGS. 10B and 10C together depicts a query used to examine a first and a second set of rows (having the same value for a key) to form a comparison result in one embodiment.

FIG. 11A depicts a portion of a report generated in response to a request for comparison of a first and a second very large XML data in one embodiment.

FIG. 11B depicts a user interface which displays the comparison results of performance of a request for comparison of a first and a second very large XML data in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention enables comparison of data sets encoded in extended markup language (XML). In one embodiment, a first and second XML data received for comparison are stored in the form of respective multiple rows in a database. A first and second set of rows (respectively corresponding to the first and second XML data) having the same value corresponding to a key are retrieved from the database and examined to form a comparison result. The same operations may be performed for each value of the key (and also other keys) present in either of the XML data sets.

In a scenario that specific values for the key are determined to exist only in one of the first and second XML data (sets), the corresponding comparison results are formed from the respective rows of the data set having the specific values.

According to another aspect of the present invention, the key used for comparing the first and the second XML data is contained in a set of keys specified in a metadata. The metadata may be created by a user and may be received along with the first and second XML data.

According to yet another aspect of the present invention, a report is generated containing the above formed comparison results. Alternatively or in addition, the comparison results may be displayed on a display unit.

According to one more aspect of the present invention, the first and second XML data received for comparison are first converted to a corresponding first and second generic XML data. The generic XML data contains data values specified according to a pre-defined common schema (in contrast to a user-defined schema used for specifying the first and second XML data). A tabular data based on the first and second generic XML data is then created and stored in the database in the form of multiple rows corresponding to the first and second XML data.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, with other methods, or combining one more aspects/features described herein, etc. In other instances, well-known structures or operations are not shown in detail to avoid obscuring the features of the invention.

2. Example Environment

Figure 1:
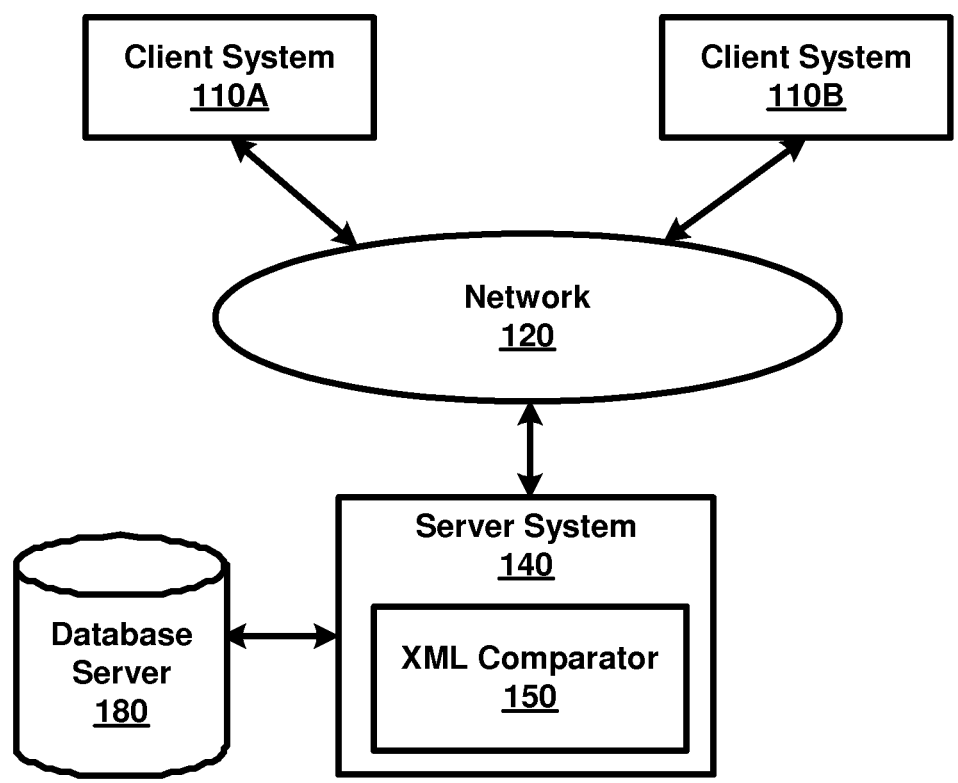
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing client systems 110A-110B, network 120, server system 140 (containing XML comparator 150), and database server 180.

Merely for illustration, only representative number/type of systems is shown in the Figure. Many environments often contain many more systems, both in number and type, depending on the purpose for which the environment is designed. Each block of FIG. 1 is described below in further detail.

Network 120 provides connectivity between various client systems 110A-110B and server system 140. Network 120 may be implemented using protocols such as Internet Protocol (IP) well known in the relevant arts. In general, in IP environments, an IP packet is used as a basic unit of transport, with the source address being set to the IP address assigned to the source system from which the packet originates and the destination address set to the IP address of the target system to which the packet is to be eventually delivered.

Database server 180 facilitates storage and retrieval of a collection of data using structured queries. Database server 180 may be used to maintain any data/information which facilitates comparison of very large XML data, for example, to store the rows corresponding to the received XML data according to an aspect of the present invention, as described in sections below.

In one embodiment, database server 180 is implemented using relational database technologies and therefore provides storage and retrieval of data using structured queries such as SQL (Structured Query Language). SQL refers to a special-purpose, nonprocedural language (generally indicates what to retrieve based on conditions, in contrast to how to retrieve) that supports the definition, manipulation, and control of data in systems implementing relational database technologies.

Each of client systems 110A-110B represents a system such as a personal computer, workstation, mobile station, etc., used by an end user to generate (client) requests to applications (such as XML comparator 150) executing in server system 140 and to receive corresponding responses. A client request may correspond to a request for sending (or otherwise specifying) two (or more) very large XML data for comparison, a request for performance of the comparison of the very large XML data sent earlier, etc.

The requests/responses may be generated/viewed using appropriate user interfaces provided by the applications executing in server system 140 and/or local applications executing in the runtime environment of client systems 110A-110B. The user interfaces may be displayed on a display unit (not shown in FIG. 1) associated with each of the client systems 110-110B.

Server system 140 represents a server, such as a web/application server, which executes applications such as XML comparator 150. Server system 140 may also contain other software programs such as operating system, device drivers, etc., (not shown) that provides a runtime environment facilitating the execution of applications such as XML comparator 150.

XML comparator 150 compares two XML data (sets) according to several aspects of the present invention. XML comparator 150 may be implemented in the form of a software program designed to receive client requests for comparing very large XML data, process the client requests, and send the results of processing as corresponding responses to the requesting client system. Though the description below is provided with respect to only two XML data sets, it should be appreciated that the features can be extended to compare more than 2 XML data sets as well.

In one prior approach termed DOM (Document Object Model), the two XML data to be compared is first loaded into a volatile memory (RAM) in the form of corresponding tree/DOM representations, and then the comparison is performed by examining the nodes corresponding to the two XML data. According to one prior DOM based approach, the volatile memory is estimated to require approximately 10 times the size of XML data. As such, substantially large amounts of volatile memory may be required for processing very large XML data.

In an alternative prior approach (with reduced memory requirements), the comparison is performed by processing the two XML data in a sequential manner using a SAX (Simple API for XML) based comparison tool. Such an approach may mandate the XML data to contain data in a pre-define order and the XML structure to be known in advance. As such, the SAX based approach may not be viable when diverse XML data with varying data hierarchies including duplicate data records (and having no XML schema available) are to be compared. Though a SAX based comparison tool can be implemented to overcome such issues by using multiple passes over the XML data, such a modified approach may not be viable for processing very large XML data.

XML comparator 150 provided according to several aspects of the present invention provides for comparison of very larger XML data while overcoming at least some of the above-described shortcomings as described below with examples.

3. Comparing Very Large XML Data

Figure 2:
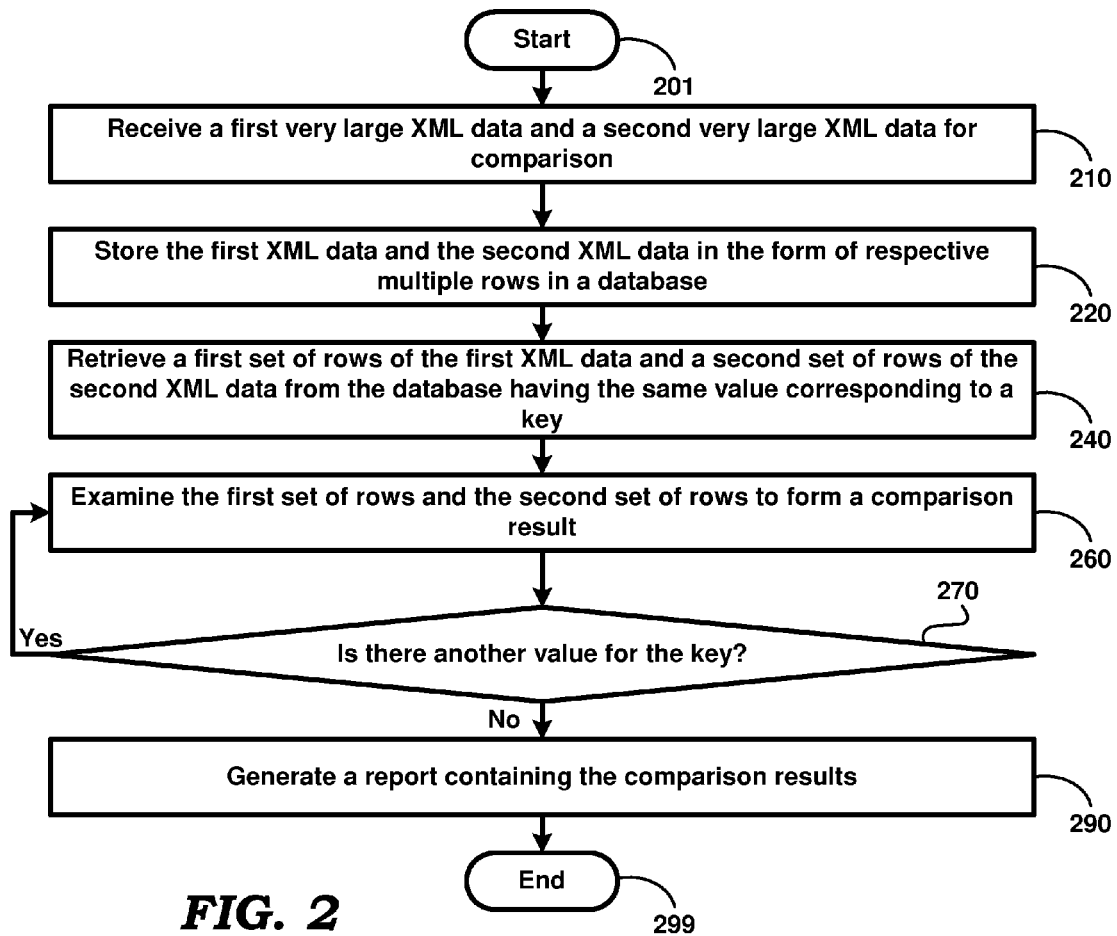
FIG. 2 is a flowchart illustrating the manner in which comparison of very large XML data is provided according to an aspect of the present invention.

FIG. 2 is a flowchart illustrating the manner in which comparison of very large XML data is provided according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 210.

In step 210, XML comparator 150 receives a first large XML data and a second very large XML data for comparison. The first and second XML data may be received from a user using one of client systems 110A-110B. In one embodiment, the first and second XML data are received in the form of respective XML documents/files containing the data to be compared.

Alternatively, XML comparator 150 may receive an identifier (or multiple identifiers) identifying a respective set (one or more) of XML documents/files containing the data to be compared. XML comparator 150 may then retrieve (and form) the first and second very large XML data to be compared from a non-volatile memory (such as a hard disk in server system 140 or in external systems, not shown) storing the set of XML documents/files as indicated by received identifier(s).

As described in the background section, the first and second received/formed very large XML data may contain any desired user specified set of elements/attributes (generally referred to as a schema), with the XML data being provided as values associated with any combination of the user specified elements and/or attributes (based on the schema). It may be noted that the first and second XML data are based on the same schema to enable comparison of the XML data to be performed.

It may be appreciated that the labels "first" and "second" for the very large XML data received for comparison are merely used for identifying the corresponding XML data sets. For example, the first and second XML may also be respectively referred to as "primary" and "secondary" XML data.

In step 220, XML comparator 150 stores the first XML data and the second XML data in the form of respective multiple rows in a database. The database may correspond to a database provided local to server system 140 or provided in database server 180.

The storage of the XML data in a database facilitates the performance of the comparison of smaller portions of the XML data using structured queries such as SQL in case of relational databases and SQL XPATH queries incase of XML databases. Further, the storage in a database enables very large quantity of XML data to be compared, while ensuring that only a small amount of volatile memory is required for processing the XML data.

In step 240, XML comparator 150 retrieves a first set of rows of the first XML data and a second set of rows of the second XML data from the database having the same value corresponding to a key.

A key represents any desired combination of elements/attributes which logically identify portions of the XML data. Generally, keys are chosen such that they provide a unique identifier for relevant portions (in one embodiment, business entities) contained in the first and second XML data. For example, an element such as "EmployeeId" corresponding to an employee identifier may be chosen as a key in a scenario that the XML data contains "Employee" elements uniquely identified by the employee identifier.

It should be appreciated that each of the elements/attributes, which is part of a key, can have a corresponding (sub) value. For convenience, the sub-values together are viewed as forming a value for the key used in retrieving the specific rows of the first and second XML data. A key is said to have a different value when any of the component attributes/elements has a different sub value.

The retrieval of the rows from the database matching the same value of the key may be performed in a known way. In one embodiment, where the database is contained in database server 180 implemented using relational database technologies, XML comparator 150 generates a SQL query designed to retrieve only the rows having the same value corresponding to the key as described below with examples. Alternatively, the query may be generated in any suitable/convenient format as required by the system storing the database.

XML comparator 150 then performs the query on the database to identify the first and second set of rows having the same value corresponding to the key. The query may be performed on the database in a known way. In the above embodiment when database server 180 is implemented using relational database technologies, the performance of the query may entail first sending a command (containing a username and a password for authentication) for creating a connection with the database, receiving an indication indicating a successful connection, sending the query for execution to the database, and receiving a confirmation of successful execution of the query.

In step 260, XML comparator 150 examines the first set of rows and the second set of rows to form a comparison result. Examination generally entails comparing the value of each element/attribute of a retrieved row from the first set with the value of the same element/attribute of a retrieved row from the second set. The examination of the data in the rows may be performed by a program logic designed to examine the data in each of the first set of rows and the data in each of the second set of rows and to form a result based on the examinations performed. Alternative approaches can be employed for such examination, as described in sections below with an example.

In step 270, XML comparator 150 determines whether another value for the key exists. The determination may be performed by inspecting the values of the (attributes/elements forming the) key in the first and second XML data stored in the database. Control passes to step 260 if another value (different from the same value) for the key exists and to step 290 otherwise.

It may be appreciated that in step 260, XML comparator 150 may retrieve from the database a third set of rows of the first XML data and a fourth set of rows of the second XML data which have the same another value corresponding to the key. The third and fourth sets of rows are then examined to form another comparison result. Similarly, steps 240 and 260 are repeated for each different value of the key and the corresponding comparison results are formed.

It may be appreciated that in a scenario that a specific value corresponding to the key occurs only in the first XML data (or the second XML data), only one specific set of rows of the first XML data (or the second XML data) having the specific value corresponding to the key is retrieved from the database. The examination step (260) is then skipped and the comparison result is formed from the specific set of rows retrieved from the database.

In step 290, XML comparator 150 generates a report containing the comparison results formed from the examinations performed in step 260. The report may then be sent as a response to the request for comparison received from a user using one of client systems 110A-110B. Accordingly, the report may be sent to the requesting client system.

Alternatively, in a scenario that a user has requested for comparison of the XML data to be performed immediately (or as soon as possible), the comparison results may be displayed on a display unit (not shown) associated with one of client systems 110A-110B. The flow chart ends in step 299.

Thus, the comparison of very large XML data is provided to the users. It may be appreciated that the ability to compare very large XML data is facilitated by the storage of the XML data in the form of rows in the database. In one embodiment, XML comparator 150 preprocesses the first and second XML data to generate respective tabular data corresponding to the XML data. The generated tabular data is then stored in a table (or in multiple tables) in the database.

The description is continued describing the manner in which very large XML data is preprocessed to generate a tabular data (thereby facilitating the storage of the XML data in a database) in one embodiment. However, alternative embodiments can be implemented without using the preprocessing.

4. Preprocessing Very Large XML Data

Figure 3:
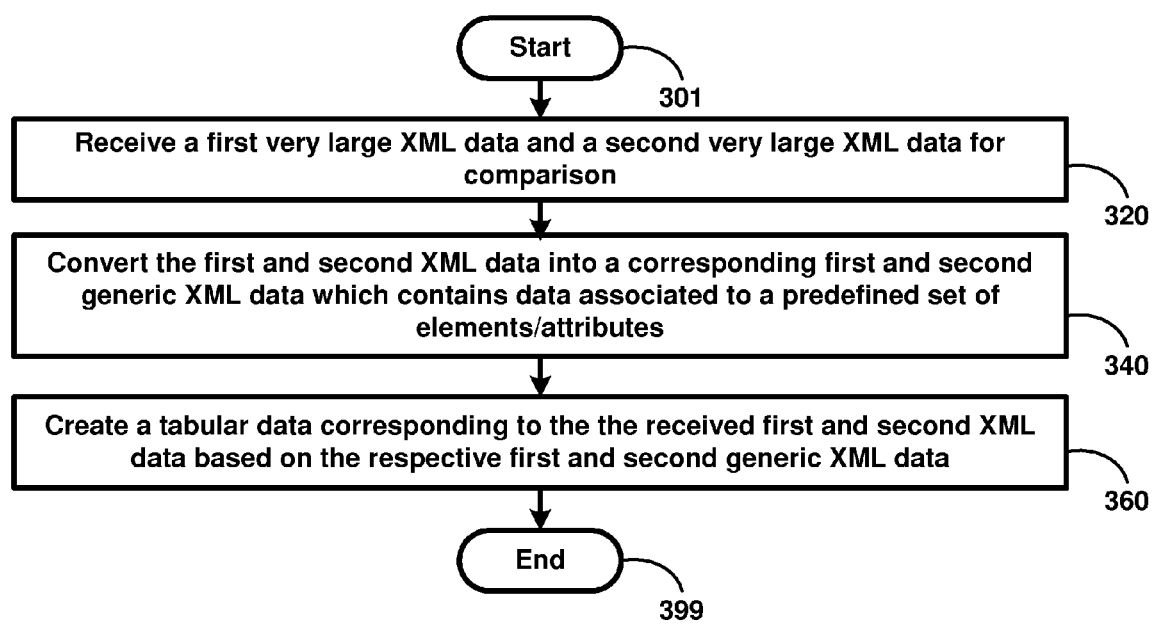
FIG. 3 is a flowchart illustrating the manner in which a first and a second very large XML data sought to be compared is preprocessed to generate a corresponding tabular data according to an aspect of the present invention.

FIG. 3 is a flowchart illustrating the manner in which a first and a second very large XML data sought to be compared is preprocessed to generate a corresponding tabular data according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 301, in which control immediately passes to step 320.

In step 320, XML comparator 150 receives a first very large XML data and a second very large XML data for comparison. The XML data (containing data associated with a user-defined set of elements/attributes, that is, a user-defined schema) may be received similar to the manner described in step 210 of FIG. 2 and therefore the description is not repeated for conciseness.

In step 340, XML comparator 150 converts the first and second XML data into a corresponding first and second generic XML data which contains data associated to a pre-defined set of elements/attributes (as specified by XML comparator 150).

The generic XML data is generated according to a common set of elements/attributes or a common/pre-defined schema (in contrast to user-defined schema used in the first and second XML data), implying that all (or many) very large XML data sets are converted using the same common set of elements/attributes to generate corresponding generic XML data. Such conversion to a common form simplifies creation of tabular data, as will be clear from the description below.

It may be appreciated that such a mapping (to a common/pre-defined schema) can be performed irrespective of the respective user-defined schema (defining elements/attributes and relationships) being used for the XML data sets sought to be compared. By performing such mapping, the same program logic can be used to process the XML data of different schemas, as will be apparent to a skilled practitioner based on the description below.

The conversion of the XML data to the generic XML data may be done similar to transforming XMLs from one format to another, for example, by using an appropriate set of XSL (XML Style Language) instructions. In one embodiment, the received XML data is first processed using a SAX (Simple API for XML) parser which provides an event-based interface by reading/processing the XML data in a sequential manner (in sharp contrast to DOM approach where a tree representation of the complete XML data is required to be created in volatile memory).

The SAX parser may generate events corresponding to finding a start tag of an element, an end tag of an element, the text contained in the data, etc. Events received from the SAX parser are processed (using data structures such as a stack for keeping track of the elements etc.) and the names and values corresponding to the various user specified elements/attributes are determined.

The determined names and values and other associated information such as the depth (hierarchical position) of the element, a flag indicating whether the element is a top-level element or not etc. are then appropriately encoded using the pre-defined set of elements/attributes. The processing of the events is continued until all of the XML data is processed by the SAX parser.

Thus, the received first and second very large XML data are respectively converted to the first and second generic XML data containing information/data represented using a pre-defined set of elements/attributes.

In step 360, XML comparator 150 creates a tabular data corresponding to the received first and second XML data based on the respective first and second generic XML data. A tabular data refers to information/data represented in the form of a table having a corresponding set of rows and columns (generally pre-defined).

Accordingly, the creation of the tabular data from the generic XML data may entail identifying portions of the generic XML data corresponding to elements in the received XML data, associating the identified portions to the corresponding elements, etc. In one embodiment, a single tabular data is created from the first and second generic XML data, with the value in a specific column in the tabular data indicating whether a row corresponds to the first or the second XML data. The flow chart ends in step 399.

Thus, the first and second very large XML data are preprocessed and the tabular data corresponding to the XML data is created. The tabular data thus created may be stored in the form of corresponding rows in a database as described above with respect to step 220 of FIG. 2.

XML comparator 150 may then retrieve corresponding rows (of the first and second XML data) matching different values of a key and examine the retrieved rows to form comparison results. The description is continued illustrating the manner in which comparison of very large XML data is performed in one embodiment.

5. Illustrative Example

FIGS. 4A to 11B together illustrate the manner in which comparison of very large XML data is performed in one embodiment. Each of the Figures is described in detail below.

FIGS. 4A-4B together depicts a user interface which enables users to send requests for comparison of very large XML data in one embodiment. The two interfaces depicted in FIGS. 4A and 4B (and shown in display area 400) correspond to the two steps that a user needs to perform to send a request for comparison to XML comparator 150.

Display area 400 may be displayed on a display unit (not shown) associated with either server system 140 or one of client systems 110A-110B used by a user to send a request for comparison. In one embodiment, the display area 400 corresponds to a display provided by a browser application in one of client systems 110A-110B.

FIG. 4A depicts an interface which enables a user to specify the two very large XML data to be compared as the first step. Thus, a user may specify a name "Payment Terms Comparison" for the comparison request in text field 410, the name/identifier "SrcPaymentTerms.xml" of a first XML document in text field 415, the name/identifier "TargetPaymentTerms.xml" of a second XML document in text field 420 and the format "PDF" in which the report (containing the comparison results) is to be generated in select field 425.

The user may use the buttons labeled "Browse" (shown associated with text fields 415 and 420) to select the XML documents (containing very large XML data) to be compared. After specifying the identifiers of the XML documents, the user may select/click button 430 labeled "Next" to cause the interface of FIG. 4B to be displayed in display area 400.

FIG. 4B depicts an interface which enables a user to specify when the comparison is to be performed as the second step. The user can select option 460 to indicate that the comparison (and the corresponding report) is to be performed immediately (or as soon as possible).

Alternatively, the user can select option 470 to indicate that the comparison is to be performed at a scheduled date and time. The user can also specify the scheduled date using date field 475 and the scheduled time using the compound field 478. After specifying the date/time of performance of the comparison, a user can select/click button 490 labeled "Finish" to indicate that the two steps for sending a comparison request is completed.

Thus, on selecting button 490, the browser application providing the above interfaces sends a request for comparison to XML comparator 150. The request for comparison may contain the first and second very large XML data (respectively retrieved from the XML documents specified in text fields 415 and 420) and a data indicating when the comparison is to be performed.

The description is continued describing a sample portion of a very large XML data in one embodiment.

6. Example of Very Large XML Data

FIGS. 5A-5C and 6A-6C together respectively depicts sample portions of a first and a second very large XML data (received from a user) which are sought to be compared in one embodiment. Though a very larger XML data generally contains elements/attributes (and corresponding values) in the order of thousands/millions, only a few representative elements/attributes of the XML data are included in the sample portions for conciseness.

Referring to FIGS. 5A-5C, line 501 indicates that the following data is encoded in XML. Lines 502-515A (between the start tag "<SetupPaymentTermAM>" and the end tag "</SetupPaymentTermAM>") represents a sample portion of a first very large XML data related to specifying the details of different types of payment terms.

The start tag "<SetupPaymentTermAM>" and end tag "</SetupPaymentTermAM>" together is viewed as forming an element with name "SetupPaymentTermAM", with the data contained between the tags representing the value corresponding to the element. The element may also have associated attributes (such as "ID", "MIN_API_VERSION" shown in line 502) with corresponding values (such as "BE" and "115.4"). Only the names of the elements are referred to in the following description for conciseness.

Lines 504-514A (element "TermsBVO") specifies a set of payment terms identified by the identifier "VIEW", which in turn contains individual payment terms (element "TermsBVO") such as lines 504-527, 528-552, 553-576, and 577-513A.

Lines 504-527 (element "TermsBVO") specify the details of a specific payment term. In particular, lines 505 (element "Name") specifies a unique name identifying the specific payment term. Lines 506-518 specify other details of the payment term such as the description, the start and end date during which the payment term is active, a flag indicating whether the payment term is in use, flags indicating whether a partial discount and a prepayment option are associated with the payment term, etc. Lines 519-526 (element "TermsLinesVO") specify the details of a line item in the payment term.

Similarly lines 528-552, 553-576, and 577-513A respectively depict the details of corresponding payment terms. It may be observed that the payment term depicted in lines 577-513A (element "TermsBVO") contains multiple occurrences of the element "TermsTIVO" which are not present in the other payment terms (that is, the other occurrences of the element "TermsBVO").

Referring to FIGS. 6A-6C, line 601 indicates that the following data is encoded in XML, with lines 602-6145A (element "SetupPaymentTermAM") representing a sample portion of a second very large XML data related to specifying the details of different types of payment terms.

Lines 603-613A (element "TermsBVO") specifies a set of payment terms identified by the identifier "VIEW" similar to the set of payment terms specified in lines 504-514A and therefore the description is not repeated in detail for conciseness. It may be observed that the payment term with name "Net25" (in lines 528-552) is not contained in the second XML data, while the payment term with name "Net5" (in lines 652-675) is not contained in the first XML data.

It may be appreciated that the comparison of the first and second very large XML data (as shown in FIGS. 5A-5C and 6A-6C) may be performed based on specific/desired combination of elements and/or attributes (forming the keys). An aspect of the present invention enables the keys to be specified by a user in the form of a metadata as described below with examples.

7. Example Metadata

FIG. 7 depicts a portion of a metadata specifying the keys based on which a first and a second very large XML data (sample portions of which are shown in FIGS. 5A-5C and 6A-6C) are sought to be compared in one embodiment. In one embodiment, the metadata is specified in the form of a properties file, with each line in the file indicating a corresponding key. However the metadata can be specified in any other convenient format in alternative embodiments.

The metadata may be provided by (or received from) users using one of client systems 110A-110B along with or separately from the XML data sets sought to be compared. It may be appreciated that the steps of FIG. 2 may be suitably modified to perform the comparisons based on the keys specified in the metadata as will be apparent to a skilled practitioner. Further, during preprocessing described in FIG. 3, the generic XML data corresponding to the first and second XML data sought to be compared may be generated based on the set of keys specified in the metadata to facilitate speedier comparison of the rows.

Line 721 represents a comment (as indicated by the "#" character at the beginning of the line) thereby causing the line to be ignored during execution of XML comparator 150. Line 721 indicates that the keys corresponding to a record/element are to be specified as a comma-separated list of values.

Accordingly, line 722 specifies that the element "Name" is a key corresponding to the element "TermsBVO", thereby indicating that the comparison of the different occurrences of the element "TermsBVO" (in the first and the second XML data) are to be compared based on the values corresponding to the element "Name".

Thus, XML comparator 150 receives sample portions of the first and the second very large XML data (respectively shown in FIGS. 5A-5C and 6A-6C) and the corresponding metadata shown in FIG. 7 as a request for comparison from a user (using a browser application in one of client systems 110A-110B). XML comparator 150 then preprocesses the received first and second XML data to generate corresponding tabular data as described below with examples.

8. Example Illustrating Preprocessing of Very Large XML Data

FIGS. 8A-8D and 9A-9D together illustrate the manner in which a first and a second very large XML data (received for comparison) are preprocessed to generate corresponding tabular data in one embodiment. Each of the Figures is described in detail below.

As described above with respect to FIG. 3, XML comparator 150 first converts the received portion of the first very large XML data (shown in FIGS. 5A-5C) to a generic XML data which contains data associated to a predefined set of elements/attributes. In one embodiment, the conversion is performed using a SAX parser as described above.

FIGS. 8A-8D depicts a portion of a generic XML data generated corresponding to a very large XML data (sample portions of which is shown in FIGS. 5A-5C) in one embodiment. The example here is based on a specific set of elements/attributes for the generic XML, but different set of elements/attributes can be chosen as suited for the specific environment, as will be apparent to one skilled in the relevant arts by reading the disclosure provided herein. In general, the elements/attributes set needs to cover all the expected elements/attributes of different XML data desired to be compared.

Line 801 indicates that the following data is encoded in XML. Lines 802-821A (element "EXT") represents generic data generated corresponding to the sample portion of the very larger XML data depicted in FIGS. 5A-5C. The associated attributes "req_id" and "source" respectively indicates the identifier of the request "1234" and the identifier of the very larger XML data "Payment_Terms" based on which the generic XML data is generated.

The request identifier may be specified by a user or generated by XML comparator 150 to uniquely identify the received XML data, while the identifier of the XML data may correspond to the name or the location of a document/file containing the XML data. It may be observed that another attribute "primary" indicates whether the following data corresponds to the primary/first XML data (value "true") or the secondary/second XML data (value "false").

Lines 803-807 (element "H") specify the details of the specific element "SetupPaymentTermAM" contained in the received first XML data. In particular, the attribute "DP" in line 803 specifies the depth "1" of the specific element, that is, the hierarchical position of the specific element with respect to the root element of the received XML data.

It may be appreciated that the different occurrences of element "H" represent different records (business entities) that may be desired to be compared. The specific elements/attributes in the received XML data to be encoded as element "H" may be performed in a predetermined manner. In one embodiment, XML elements in the received XML data which contain other elements (that is, sub elements) are encoded as element "H" in the generic data.

Line 804 (elements "T", "ID" and "PID") respectively specify a flag to indicate whether the specific element is a top level (value "-1") or a nested (value indicating the nesting depth) element/record, a unique identifier associated with the element (as generated by XML comparator 150) and the unique identifier corresponding to the parent (the element containing the specific element, with the value "0" indicating that the specific element is not contained in any other element) of the specific element "SetupPaymentTermAM".

Line 805 (elements "HC" and "HD") respectively specify a hash code and a hash detail generated corresponding to the specific element to facilitate searching of the XML/tabular data. It may be observed that the hash code and the hash details are generated by XML comparator 150 based on the key "Name" specified in the metadata (shown in FIG. 7) received along with the XML data sets sought to be compared.

Line 806 (elements "S", "N", and "D") respectively specify the business entity name "Payment_Terms" (same as the value of the "source"), the name "SetupPaymentTermAM" and the display name "Setup Payment Term" corresponding to the specific element. The display name may be specified in the received XML data or generated from the name in a known way, for example, by inserting a space character before each upper case character occurring in the name and then removing trivial words containing only one letter.

Similarly, lines 808-823 specify the details of another element "TermsBVO" contained in the received XML data (corresponding to the first payment term shown in lines 504-527). It may be observed that the depth of the element is indicated to be "3" since the element is contained in the element "SetupPaymentTermAM" and the element "TermsBVO".

Further, the element "PID" is associated with the parent identifier "1" which corresponds to the identifier of "SetupPaymentTermAM" (in line 804) thereby indicating that the element "TermsBVO" is contained in the element "SetupPaymentTermAM".

Each of lines 812-822 (element "V") specifies the details of sub elements/attributes contained in the element "TermsBVO". In particular line 612 specifies the details of a specific sub element/attribute "Name". The associated attributes "N" and "D" specify the name (as specified in the receive XML data) and the display name (generated or specified as described above) corresponding to the specific sub element/attribute. The value of the element "V" specified the specific value corresponding to the specific sub element/attribute in the received XML data.

The value of "Y" for the attribute "U" indicates that the specific sub element/attribute is a key on which the XML data can be searched (with a value of "N" or the absence of the attribute "U" indicating otherwise). It may be observed that the specific sub element/attribute "Name" is indicated to be a key as specified by the metadata of FIG. 7 (in line 722).

Lines 824-832 specify the details of the element "TermsLinesVO" contained in the element "TermsBVO" and corresponds to the line detail specified in lines 519-526 of the first payment term shown in lines 504-527. Thus, the first payment term specified in lines 504-527 in the first XML data is converted into two occurrences of element "H" (shown in lines 808-823 and 824-832) in the corresponding generic XML data.

Similarly, lines 833-855, 856-878, 879-820A (containing 4 occurrences of the element "H") respectively specify the details corresponding to the different occurrences of the element "TermsBVO" in the received sample portion of the first XML data (as shown in lines 504-527, 528-552, 553-576, and 577-513A).

Thus, the first XML data received is converted to a corresponding first generic XML data containing data associated as values corresponding to a predefined set of elements/attributes. Similarly, though not shown, XML comparator 150 converts the second XML data (sample portions shown in FIGS. 6A-6C) to a corresponding second generic XML data.

XML comparator 150 then creates a tabular data corresponding to the received first and second XML data based on the first and second generic XML data as described below with examples.

9. Example Tabular Data

FIGS. 9A-9D together depicts a portion of a tabular data created corresponding to a first and a second very large XML data (sample portions of which are shown in FIGS. 5A-5C and 6A-6C) received for comparison in one embodiment.

Table 900 depicts a portion of a tabular data indicating the details of elements/attributes contained in the received first and second XML created based on the corresponding first and second generic XML data (as described above with respect to FIGS. 8A-8D). It may be appreciated that only a single tabular data is shown as being created from both of the first and second generic XML data. However, in alternative embodiments, multiple tabular data corresponding to the first and second generic XML data can be created.

Referring to FIG. 9A, columns 921 "Name" and 922 "Display Name" respectively specifies the name and display name of for the corresponding elements/attributes as specified in the received XML data and correspond respectively to the values indicated by the elements/attributes "N" and "D" in the generic XML data generated for the corresponding elements/attributes. Columns 923 "Request_Id" and 924 "Source" respectively indicate the identifiers of the request and the identifier of the received XML and correspond to the values indicated by the attributes "req_id" and "source" associated with element "EXT" in the generic XML data.

Columns 925 "Type", 926 "Id", 927 "Parent_Id", 928 "Hashcode", and 929 "Hashcode_Details" respectively indicate the type, the unique identifier, the identifier of the parent, the hash code and the hash detail for the corresponding elements/attributes contained in the received XML data and respectively correspond to the values of the elements "T", "ID", "PID", "HC" and "HD" in the generic XML data generated for the corresponding elements/attributes.

Referring to FIG. 9B, column 930 "Matched_Flag" indicates whether the corresponding element has been matched with any other element during comparison, while column 931 "Is_Primary" indicates whether the corresponding elements/attributes belong to the first/primary or the second/secondary XML data received for comparison. Column 932 "Depth" indicates the hierarchical position of the corresponding elements/attributes and corresponds to the value of the attribute "DP" in the generic XML data.

Column 933 "Attributes" is an XML column storing an XML value representing the (sub) elements/attributes contained in the corresponding elements/attributes of the received XML data. The XML values in column 933 may be maintained elsewhere other than in the tabular data, for example, as a BLOB/CLOB (binary/character large object) in a file/document stored on a non-volatile memory. The individual elements/attributes in the XML values may be accessed using a DOM approach.

It may be observed that an XML value corresponding to an element/attribute is created by including all the occurrences of the element "V" (corresponding to the sub elements/attributes) in the generic XML data generated corresponding to the elements/attribute.

Further, each occurrence of the element "V" is created to contain an element "A" or element "B" (based on whether the element "V" is contained in the primary or the secondary XML data) associated with the value of element "V" in the generic XML data. The value of element "A" represents the primary value of the sub element/attribute, with the value of element "B" representing the secondary value of the sun element/attribute. The occurrences of the element "V" are then included in the element "H" and maintained associated with the corresponding element/attribute.

Though not shown, it may be appreciated that the element "H" may be associated with attributes like name space definitions such as "xmlns:xsi" and "xsi:noNamespaceSchemaLocation" (having corresponding values) to facilitate faster processing of the XML values stored in column 933.

Referring to FIG. 9A, each of rows 951-972 specifies details corresponding to elements/attributes contained in the received sample portions of a first and a second very large XML data (as depicted in FIGS. 5A-5C and 6A-6C).

In particular, row 953 specifies various details corresponding to an occurrence of the element "TermsBVO" (in the first XML data) such as the name "TermsBVO", the display name "Terems B", the request identifier "1234", the identifier of the XML data "Payment_Terms", the type "0", the unique identifier "3", the identifier of the parent "1" (indicating that it is contained in element "SetupPaymentTermAM" of the first XML data as depicted in row 951), the hashcode "-1993028299", and the hash code detail "3TermsBVONameDue on 20th".

Referring to FIG. 9B, row 953 specifies further detail corresponding to the occurrence of the element "TermsBVO" such as the matched flag "N" indicating that the element has not yet been matched with any other element, the primary flag "Y" indicating that the element occurs in the first/primary XML data and the depth "3". The XML value in column 933 corresponding to row 953 indicates that sub elements/attributes such as "Name", "CreditCheckFlag", "Description", etc. are contained in the element "TermsBVO".

It may be appreciated that by encoding elements containing sub-elements as different occurrences (corresponding multiple rows of tabular data) of element "H", the hierarchical structure of the received XML data (for example, lines 504-527) is transformed to a flat structure (lines 808-823 and 824-832 of the generic XML data) in a way suitable for storing in relational database tables (rows 953 and 961). It should be further appreciated that the information corresponding some of the hierarchical data can be stored in the same entry (specific row and column) of a table as well.

Accordingly, the data contained in rows 953 and 961 capture the same information specified in the element "TermsBVO" in lines 504-527 in the received XML data. Similarly, rows 951-952 and 954-972 represent/capture the information contained in other elements/attributes of the received XML data. It may be observed that FIG. 9B depicts the details of the columns 930-933 only for the rows 951-957. FIGS. 9C and 9D respectively depict the details of the columns 930-933 corresponding to the rows 958-964 and 965-972.

Thus, XML comparator 150 preprocesses a first and second very large XML data to be compared and generates a corresponding tabular data. In one embodiment, the tabular data corresponding to the first and second XML data is stored in the same (single) table in a database, for example, in database server 180. However, in alternative embodiments, the tabular data may be stored in multiple tables in the same (or different) databases.

XML comparator 150 then generates queries for comparing the values of the elements in the first and the second XML data as described below with examples.

10. Example Illustrating Comparing Very Large XML Data

FIGS. 10A-10C together illustrates the manner in which comparison of very large XML data (sets) is performed in one embodiment. As described above, the comparison is performed by first retrieving a first and second set of rows (of the first and second XML data) having the same value corresponding to a key.

FIG. 10A depicts a query used to retrieve rows having a specific value corresponding to a key in one embodiment. The query is in the form of a SQL query directed to the table storing the tabular data (depicted in FIGS. 9A-9D) corresponding to the first and second very large XML data (sample portions of which are shown in FIGS. 5A-5C and 6A-6C) sought to be compared.

Lines 1011-1015 depict a query for retrieving rows having the value "Due on 20th" corresponding to the key "Name" (as indicated in the metadata of FIG. 7) corresponding to the value of the key in the element depicted in row 953. The keyword "SELECT" (all keywords in SQL are depicted in capital case) in line 1011 indicates that the specific information (as indicated by lines 1011) contained in the rows of the tabular data matching the criteria specified after the keyword "WHERE" in lines 1013-1015 are to be retrieved from the tables indicated after the keyword "FROM" in line 1012.

Thus, line 1011 specifies that the unique identifier of the elements/rows is to be retrieved for each matching element/attribute in the tabular data. Line 1012 indicates the name "az_reporter_data" of the table containing the tabular data corresponding to the XML data sets sought to be compared.

Line 1013-1015 together specifies the criteria to be used for determining the matching rows. In particular, line 1013 indicates that the matching rows should have the request identifier as "1234", and the source as "Payment_Terms". Line 1014 indicates that the matching rows should also have the hashcode as "−1993028299" (corresponding to the value "Due on 20th" for the key "Name"), and the parent identifier as "1" (same hierarchical position as the element in row 953). Line 1015 further indicates that the matching rows should also have a value of "N" for the primary flag (column "is_primary") indicating that the rows should be part of the secondary/second XML data and that the matched flag have the value "N" indicating that the element/row has not been previously matched.

Thus, on execution of the query depicted in FIG. 10A, the identifiers ("3") of the rows/elements (row 954) in the tabular data of the second XML data (which have not been matched before) having the same value "Due on 20th" corresponding to the key "Name" are retrieved. XML comparator 150 may then retrieve row 953 as the first set of rows of the first XML data and row 954 as the second set of rows of the second XML data having the same value corresponding to a key. The retrieved rows may then be examined to generate a comparison result.

The examination of the retrieved rows may be performed using a program logic, wherein each of the values of the sub elements/attributes in element/row 953 is compared with the corresponding values of the same sub elements/attributes in element/row 954 to form a comparison result. In one embodiment, the examination of the retrieved rows is performed using a query as described below.

FIGS. 10B and 10C together depicts a query used to examine a first and a second set of rows (having the same value for a key) to form a comparison result in one embodiment. Lines 1021-1072 depict a query which indicates that the specific information (as indicated by lines 1021-1067) contained in the rows of the tabular data matching the criteria specified after the keyword "WHERE" in lines 1069-1072 are to be retrieved from the tables indicated after the keyword "FROM" in line 1068.

Thus, line 1068 indicates that the matching rows are to be retrieved from two instances named "prim" and "sec" (corresponding to the first and the second XML data) of the table named "az_reporter_data". Lines 1069-1070 indicate that the rows having the identifier "3" and the primary flag as "Y" are to be retrieved from the "prim" table instance corresponding to the first set of rows (row 953) of the first XML data. Lines 1071-1072 indicate that the rows having the identifier "3" and the primary flag as "N" are to be retrieved from the "sec" table instance corresponding to the second set of rows (row 954) of the second XML data.

Line 1021-1022 indicates that respective XML values (hereafter referred to as the primary and the secondary XML values) in the "Attributes" column of the "prim" and the "sec" table instances are to be retrieved and transformed based on the XSL (XML Style Language) portion specified in lines 1023-1066.

Broadly, the XSL portion causes a new XML value to be generated having all the elements contained in the primary and secondary XML values. The new XML value is generated in such a way that each occurrence of the element "V" having the same name in both the primary and secondary XML values is transformed to a corresponding new occurrence of the element "V" in the new XML value containing an element "A" associated with the value specified in the primary XML value for the same name, and an element "B" associated with the value specified in the second XML value for the same name.

In particular, lines 1026-1060 are executed for each occurrence of element "H" in either the primary or the secondary XML values. Lines 1028-1058 are executed for each occurrence of the element "V" contained in a single occurrence of the element "H". Lines 1027 and 1029 indicates that a corresponding occurrence of the elements "H" and "V" are created in the transformed new XML value.

Lines 1030-1040 indicate that the values of the attributes (such as "N", "U", "D", "A1"—a language indicator for tracking the language corresponding to the value, if there are multiple language values in the XML data) of an occurrence of element "V" in primary/secondary XML value is copied to the corresponding occurrence of the element "V" in the new XML value. Lines 1041-1045 indicate that the value/text of the element "A" contained in the element "V" is to be copied as the value of the element "A" in the occurrence of the element "V" in the new XML value.

Lines 1046-1052 indicate that the value of the element "B" is to be copied to the new XML value only if the name of the element "V" in the primary XML value matches the name of the corresponding element "V" in the secondary XML value. Lines 1056-58 indicate that the occurrences of element "V" in the secondary XML value having no match with the primary XML value are to be copied as such to the new XML value.

Thus, the new XML value generated by transforming the primary and secondary XML values contains elements "A" and "B" specifying the values in the primary and the second XML values (that is, the first and second XML data) for each occurrence of the element "V".

The new XML is then processed using the function "existsnode" (line 1021) which identifies elements that match the criteria "/H/V[./A/text( )!=./B/text( ) and not(@U="Y")]" (as indicated in line 1067). Accordingly, the function "existsnode" examines each of the occurrences of the element "V" in the new XML value to determine whether there exists a single occurrence having the value/text associated with the element "A" different from the value/test associated with the element "B" (and that the single occurrence does not correspond to a key). The function "existsnode" then returns a value "1" if such a single occurrence exists (indicating that the primary and secondary XML values are different) and the value "0" otherwise.

The returned value is processed using the function "decode" which returns the final value "C" corresponding to the value "1" returned by the function "existsnode" and the final value "N" otherwise (as indicated in line 1067). The final value is then stored in the variable "v_is_different" as indicated in line 1067. The final value represents the comparison result of examining a first and second set of rows having the same value for a key.

Thus, the query of FIG. 10A can be performed for each value of the key in the first XML data (contained in corresponding rows of the tabular data and having the primary flag as "Y"). In a scenario that the performance of the query of FIG. 10A generates a result (containing a set of identifiers), the query depicted in FIGS. 10B-10C is performed for each of the set of identifiers and the corresponding comparison result is generated.

Alternatively, if the result of the query of FIG. 10A is indicated to be null/empty (that is no matching rows in the second XML data), the element/row corresponding to the specific value of the key can be determined to be contained only in the first XML data. Similarly, other such values of the key can be determines and a comparison result can be formed by including the elements/rows corresponding to such keys.

It may be appreciated that during the comparison process described above, the value of the column "Matched_Flag" can be updated based on whether a corresponding row is matched (value "Y") or not (value "N") during the comparison process. After all the values of the key in the first XML data have been processed, the rows/elements having the primary flag as "N" and the matched flag as "N" can be retrieved from the tabular data. The retrieved rows correspond to the elements in the second XML data which have not yet been matched, thereby constituting the elements contained only in the second XML data. A corresponding comparison result can be formed by including the retrieved rows.

Thus, XML comparator 150 performs the comparison of the first and second XML data using queries to form corresponding comparison results. The corresponding results may be provided to the user (who requested the comparison to be performed) as a response to the request for comparison.

The comparison results may be provided in any desired/convenient manner. In one embodiment, XML comparator 150 generates a report containing the comparison results corresponding to the performance of a request for comparison as described below with examples.

11. Example Illustrating Provision of Comparison Results

FIG. 11A depicts a portion of a report generated in response to a request for comparison of a first and a second very large XML data in one embodiment. Area 1100 depicts a portion of a report generated in response to a request for comparison received from a user using the interfaces depicted in FIGS. 4A-4C. As such, the report may contain the comparison results generated by execution of queries depicted in FIGS. 10A-10C.

Text 1110 indicates the specific data and time of generation of the report. Table 1120 indicates the specific legend used to indicate the comparison results in the report. For example, table 1120 indicates that the characters "<=" for the comparison result means that the element/record is contained exclusively in the primary (first) very large XML data.

Table 1130 depicts the details of the various elements/attributes contained in the first/second very large XML data. In particular, column 1131 specifies the name, column 1132 the value in the primary/first XML data, and column 1134 the value in the secondary/second XML data for each of the corresponding elements/attributes. Column 1133 indicates the comparison result in accordance with the legend shown in table 1120.

Thus, in row 1141, the characters "~=" indicate that the specific occurrence of the element "TermsBVO" (display name "Terms B") having the name "Due on 20th" is present in both the first and the second XML data and differs in the attributes and nested records (elements). Row 1142 indicates the specific element/attribute whose value is different in the first and the second XML data. Row 1143 indicates another occurrence of the element "TermsBVO" which is exclusive to the primary/first XML data.

Thus, a report containing the comparison results of performance of a request for comparison is generated. In an alternative embodiment, the comparison results are displayed on a display unit as described in detail below.

FIG. 11B depicts a user interface which displays the comparison results of performance of a request for comparison of a first and a second very large XML data in one embodiment. Display area 1150 may be provided similar to display area 400 and therefore the description is not repeated for conciseness.

Table 1160 is similar to table 1120 and indicates the specific icons used to indicate the comparison results on the display. For example, a left arrow icon for the comparison result means that the element/record is contained exclusively in the primary (first) very large XML data. Display area 1170 enables a user to search for a specific portion of the XML data based on the payment term name (a key).

Table 1180 is similar to table 1130 and depicts the details of the various elements/attributes contained in the first/second very large XML data. In particular, columns 1181, 1183, and 1184 (similar to columns 1131, 1132, and 1134) respectively specify the name, the value in the primary/first XML data, and the value in the secondary/second XML data for each of the corresponding elements/attributes. Column 1182 indicates the comparison result in accordance with the legend shown in table 1180.

It may be observed that the portion of the XML data depicted in table 1180 is different from the portion depicted in table 1130. Thus, rows 1191 and 1192 respectively indicate corresponding occurrences of the element "TermsBVO" (display name "Terms B") which are present exclusively in the first and the second very large XML data. Rows 1193-1194 indicate specific elements/attributes whose value is different in the first and the second XML data.

It should be appreciated that though the comparison results of only portions of the XML data (sets) sought to be compared are shown in FIGS. 11A and 11B, the comparison results corresponding to other portions of the XML data may also be displayed in any convenient/appropriate manner. For example, display area 1150 may be provided with a vertical scroll bar, thereby enabling a user to scroll down to view more comparison results.

It should be further appreciated that the features described above can be implemented in various embodiments as a desired combination of one or more of hardware, software, and firmware. The description is continued with respect to an embodiment in which various features are operative when software instructions are executed.

12. Digital Processing System

Figure 12:
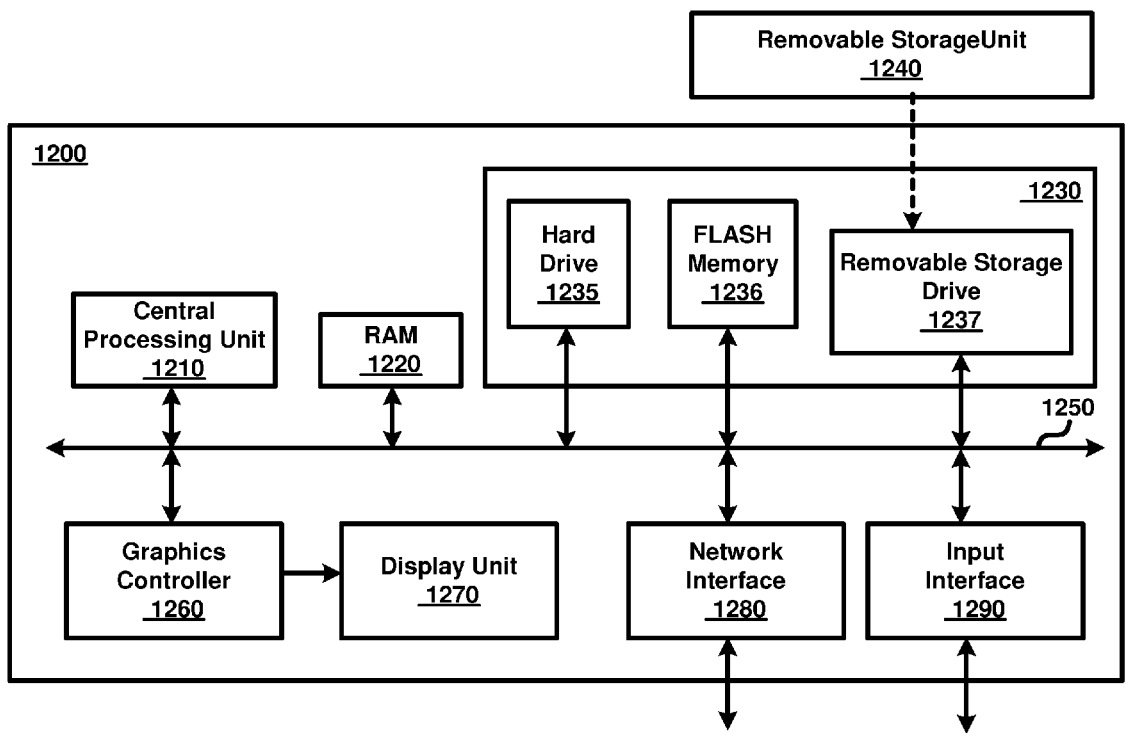
FIG. 12 is a block diagram illustrating the details of a digital processing system in which various aspects of the present invention are operative by execution of appropriate software instructions.

FIG. 12 is a block diagram illustrating the details of digital processing system 1200 in which various aspects of the present invention are operative by execution of appropriate software instructions. Digital processing system 1200 may correspond to one of server system 140 (or any other system executing XML comparator 150) and client system 110A-110B.

Digital processing system 1200 may contain one or more processors (such as a central processing unit (CPU) 1210), random access memory (RAM) 1220, secondary memory 1230, graphics controller 1250, display unit 1270, network interface 1280, and input interface 1290. All the components except display unit 1270 may communicate with each other over communication path 1250, which may contain several buses as is well known in the relevant arts. The components of FIG. 12 are described below in further detail.

CPU 1210 may execute instructions stored in RAM 1220 to provide several features of the present invention. CPU 1210 may contain multiple processing units, with each processing unit potentially being designed for a specific task. Alternatively, CPU 1210 may contain only a single general-purpose processing unit. RAM 1220 may receive instructions from secondary memory 1230 using communication path 1250.

Graphics controller 1250 generates display signals (e.g., in RGB format) to display unit 1270 based on data/instructions received from CPU 1210. Display unit 1270 contains a display screen to display the images (corresponding to the user interfaces depicted in FIGS. 4A-C and 11B) defined by the display signals. Input interface 1290 may correspond to a keyboard and a pointing device (e.g., touch-pad, mouse). Network interface 1280 provides connectivity to a network (e.g., using Internet Protocol), and may be used to communicate with other connected systems (such as client systems 110A-110B) of FIG. 1.

Secondary memory 1230 may contain hard drive 1235, flash memory 1235, and removable storage drive 1237. Secondary memory 1230 may store the data (e.g., portions of data depicted in FIGS. 5A-5C, 6A-6C, 7, 8A-8D, and 9A-9D) and software instructions (e.g., designed to generate the portion of the queries depicted in FIG. 10A-10C, in general implement the logic of XML comparator 150, described above), which enable digital processing system 1200 to provide several features in accordance with the present invention.

Some or all of the data and instructions may be provided on removable storage unit 1240, and the data and instructions may be read and provided by removable storage drive 1237 to CPU 1210. Floppy drive, magnetic tape drive, CD-ROM drive, DVD Drive, Flash memory, removable memory chip (PCMCIA Card, EPROM) are examples of such removable storage drive 1237.

Removable storage unit 1240 may be implemented using medium and storage format compatible with removable storage drive 1237 such that removable storage drive 1237 can read the data and instructions. Thus, removable storage unit 1240 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 1240 or hard disk installed in hard drive 1235. These computer program products are means for providing software to digital processing system 1200. CPU 1210 may retrieve the software instructions, and execute the instructions to provide various features of the present invention described above.

13. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of comparing very large data encoded in extended markup language (XML), said method comprising:

receiving a request from a client system, said request specifying a first XML data and a second XML data for comparison;

storing said first XML data and said second XML data respectively in the form of a first plurality of rows and a second plurality of rows in a relational database;

retrieving a first set of rows and a second set of rows from said relational database having the same value corresponding to a key, wherein said first set of rows and said second set of rows are contained respectively in said first plurality of rows and said second plurality of rows; and forming a comparison result by examining said first set of rows and said second set of rows retrieved from said relational database, wherein said retrieving and said forming are performed by execution of at least one SQL (structured query language) query directed to said relational database, said at least one SQL query generating at least a portion of said comparison result; and sending said comparison result to said client system as a response to said request.

2. The method of claim 1, further comprising:

determining that a second value exists for said key in one of said first XML data and said second XML data, wherein said retrieving retrieves a third set of rows and a fourth set of rows from said relational database having said second value corresponding to said key, wherein said third set of rows and said fourth set of rows are contained respectively in said first plurality of rows and said second plurality of rows, wherein said examining examines said third set of rows and said fourth set of rows to form a second comparison result.

3. The method of claim 1, further comprising:

converting said first XML data and said second XML data into a corresponding first generic XML data and a second generic XML data, wherein said first generic XML data and said second generic XML data contains data values specified according to a pre-defined schema, wherein said pre-defined schema is different from a user-defined schema according to which said first XML data and said second XML data are specified; and creating a tabular data corresponding to said first XML data and second XML data based on said first generic XML data and said second generic XML data, wherein said storing stores said tabular data in the form of said first plurality of rows corresponding to said first XML data and said second plurality of rows corresponding to said second XML data in said relational database.

4. The method of claim 1, wherein said first XML data and said second XML data comprises a plurality of elements,
said storing to further store said first plurality of rows in the form of a plurality of columns in said relational database,
wherein said storing stores each element having sub-elements in a corresponding row in said relational database, and the corresponding sub-elements of only leaf type in a first column of said plurality of columns in the corresponding row, wherein a sub-element of leaf type does not have further lower level elements.

5. The method of claim 1, wherein said receiving, said storing and said sending are performed in a server system implemented external to said relational database, said method further comprising:
sending, from said server system to said relational database, said at least one SQL query, wherein execution of said SQL query causes said retrieving and said forming to be performed within said relational database; and
receiving, in said server system, said comparison result as a response to sending of said at least one SQL query,
wherein said server system then sends said comparison result to said client system as said response.

6. The method of claim 5, further comprising:
determining that a third value and a fourth value exists for said key such that said third value exists only in said first XML data and said fourth value exists only in said second XML data; and
forming a third comparison result and a fourth comparison result respectively based on a fifth set of rows and a sixth set of rows retrieved from said relational database, said first set of rows and said sixth set of rows respectively having said third value and said fourth value corresponding to said key, wherein said fifth set of rows and said sixth set of rows are contained respectively in said first plurality of rows and said second plurality of rows.

7. The method of claim 3, wherein both of said first plurality of rows and said second plurality of rows are stored in a same table of said relational database.

8. The method of claim 4, wherein said comparison result indicates that a first element stored in a first row of said first set of rows and in a second row of said second set of rows are similar only if sub-elements of leaf type in said first column of said first row is similar to the sub-elements stored in said first column of said second row.

9. The method of claim 2, wherein said retrieving and said forming comprises:
executing a first SQL query to retrieve identifiers identifying said first set of rows;
generating a second SQL query by incorporating said identifiers such that said second SQL query is designed to retrieve and compare said first set of rows identified by said identifiers with corresponding ones of said second set of rows having same corresponding identifier; and
executing said second SQL query to form said comparison result,
wherein said at least one SQL query comprises said first SQL query and said second SQL query.

10. The method of claim 6, further comprising generating a report containing said comparison result, said second comparison result, said third comparison result, and said fourth comparison result.

11. The method of claim 6, further comprising displaying said comparison result, said second comparison result, said third comparison result, and said fourth comparison result on a display unit.

12. The method of claim 6, wherein said key is contained in a set of keys specified in a metadata.

13. The method of claim 9, wherein a set of values exist for said key in said first plurality of rows, wherein said method further comprises iteratively performing said executing said first SQL query, said generating and said executing said second SQL query for each of said set of values for said key.

14. The method of claim 9, wherein said second SQL query compares said first set of rows with said second set of rows using XSL transformation.

15. A machine readable medium storing one or more sequences of instructions for causing a server system to compare data encoded in extended markup language (XML), wherein execution of said one or more sequences of instructions by one or more processors contained in said server system causes said server system to perform the actions of:
receiving, from a client system, a first XML data and a second XML data for comparison, and then a third XML data and a fourth XML data for comparison, wherein said first XML data and said second XML data comprise a first plurality of elements, which are different from a second plurality of elements comprised in said third XML data and said fourth XML data, wherein each element contains a start tag, an end tag and corresponding content in between the start tag and the end tag, wherein said first plurality of elements are different from said second plurality of elements in having different start and end tags;
receiving, from said client system, a first key and a second key, wherein said first key is for comparing said first XML data and said second XML data and is comprised in said first plurality of elements, and said second key is for comparing said third XML data and said fourth XML data and is comprised in said second plurality of elements, wherein said first key and said second key have corresponding different start and end tags;
storing said first XML data, said second XML data, said third XML data and said fourth XML data respectively in the form of a first plurality of rows, a second plurality of rows, a third plurality of rows and a fourth plurality of rows in a database;
retrieving a first set of rows and a second set of rows from said database having the same value corresponding to said first key, and then retrieving a third set of rows and a fourth set of rows from said database having the same value corresponding to said second key,
wherein said first set of rows, said second set of rows, said third set of rows and said fourth set of rows are contained respectively in said first plurality of rows, said second plurality of rows, said third plurality of rows and said fourth set of rows; and
examining said first set of rows and said second set of rows to form a first comparison result of comparing said first XML data and said second XML data, and then examining said third set of rows and said fourth set of rows to form a second comparison result of comparing said third XML data and said fourth XML data.

16. The machine readable medium of claim 15, further comprising one or more instructions for:
determining that a second value exists for said key in one of said first XML data and said second XML data,
wherein said retrieving retrieves a third set of rows and a fourth set of rows from said database having said second value corresponding to said key, wherein said third set of rows and said fourth set of rows are contained respectively in said first plurality of rows and said second plurality of rows, wherein said examining examines said third set of rows and said fourth set of rows to form a second comparison result.

17. The machine readable medium of claim 15, further comprising one or more instructions for:

converting said first XML data and said second XML data into a corresponding first generic XML data and a second generic XML data, wherein said first generic XML data and said second generic XML data contains data values specified according to a pre-defined schema, wherein said pre-defined schema is different from a user-defined schema according to which said first XML data and said second XML data are specified; and creating a tabular data corresponding to said first XML data and second XML data based on said first generic XML data and said second generic XML data, wherein said storing stores said tabular data in the form of said first plurality of rows corresponding to said first XML data and said second plurality of rows corresponding to said second XML data in said database.

18. The machine readable medium of claim 16, further comprising one or more instructions for:

determining that a third value and a fourth value exists for said key such that said third value exists only in said first XML data and said fourth value exists only in said second XML data; and forming a third comparison result and a fourth comparison result respectively containing a fifth set of rows and a sixth set of rows retrieved from said database respectively having said third value and said fourth value corresponding to said key, wherein said fifth set of rows and said sixth set of rows are contained respectively in said first plurality of rows and said second plurality of rows.

19. The machine readable medium of claim 18, further comprising one or more instructions for generating a report containing said comparison result, said second comparison result, said third comparison result, and said fourth comparison result.

20. The machine readable medium of claim 18, further comprising one or more instructions for displaying said comparison result, said second comparison result, said third comparison result, and said fourth comparison result on a display unit.

21. A computing system comprising:

a database server;

a client system to enable a user to send a first XML data and a second XML data for comparison and then a third XML data and a fourth XML data also for comparison, wherein said first XML data and said second XML data are according to a first schema, wherein said third XML data and said fourth XML data are according to a second schema, wherein first schema and said second schema respective define a corresponding different hierarchical structure for a first plurality of elements forming said first XML data, said second XML data, said third XML data and said fourth XML data;

a server system operable to:

receive said first XML data and said second XML data, and then said third XML data and said fourth XML data from said client system;

convert said first XML data, said second XML data, third XML data and said fourth XML data into a corresponding first generic XML data, said second generic XML data, third generic XML data and said fourth generic XML data, all according to a pre-defined common XML schema, said pre-defined common XML schema defining a hierarchical structure for a common plurality of elements different from said first plurality of elements;

store said first generic XML data, said second generic XML data, said third generic XML data and said fourth generic XML data in the form of a first plurality of rows, a second plurality of rows, a third plurality of rows and a fourth plurality of rows in said database server;

retrieve a first set of rows and a second set of rows from said database having the same value corresponding to a first key contained in said first plurality of elements, and then retrieving a third set of rows and a fourth set of rows from said database having the same value corresponding to a second key contained in said second plurality of elements, wherein said first set of rows, said second set of rows, said third set of rows and said fourth set of rows are contained respectively in said first plurality of rows, said second plurality of rows, said third plurality of rows and said fourth set of rows; and examine said first set of rows and said second set of rows to form a first comparison result of comparing said first XML data and said second XML data, and then examining said third set of rows and said fourth set of rows to form a second comparison result of comparing said third XML data and said fourth XML data, wherein each of said first plurality of elements and said common plurality of elements contains a corresponding start tag, end tag and content in between, wherein said first plurality of elements contain tags that are different from those in said common plurality of elements.

22. The computing system of claim 21, wherein said server system further determines that a second value exists for said key in one of said first XML data and said second XML data, wherein said server system retrieves a third set of rows and a fourth set of rows from said database having said second value corresponding to said key, wherein said third set of rows and said fourth set of rows are contained respectively in said first plurality of rows and said second plurality of rows, wherein said server system examines said third set of rows and said fourth set of rows to form a second comparison result.

23. The computing system of claim 22, wherein said server system is further operable to:

determine that a third value and a fourth value exists for said key such that said third value exists only in said first XML data and said fourth value exists only in said second XML data; and form a third comparison result and a fourth comparison result respectively containing a fifth set of rows and a sixth set of rows retrieved from said database respectively having said third value and said fourth value corresponding to said key, wherein said fifth set of rows and said sixth set of rows are contained respectively in said first plurality of rows and said second plurality of rows.

24. The computing system of claim 23, wherein said server system further generates a report containing said comparison result, said second comparison result, said third comparison result, and said fourth comparison result.

25. The computing system of claim 24, wherein said server system displays said comparison result, said second comparison result, said third comparison result, and said fourth comparison result on a display unit.

26. A non-transitory machine readable medium storing one or more sequences of instructions for causing a server system to compare data encoded in extended markup language (XML), wherein execution of said one or more sequences of instructions by one or more processors contained in said server system causes said server system to perform the actions of:
receiving a request from a client system, said request specifying a first XML data and a second XML data for comparison;
storing said first XML data and said second XML data respectively in the form of a first plurality of rows and a second plurality of rows in a relational database;
retrieving a first set of rows and a second set of rows from said relational database having the same value corresponding to a key. wherein said first set of rows and said second set of rows are contained respectively in said first plurality of rows and said second plurality of rows; and
forming a comparison result by examining said first set of rows and said second set of rows retrieved from said relational database,
wherein said retrieving and said forming are performed by execution of at least one SQL (structured query language) query directed to said relational database, said at least one SQL query generating at least a portion of said comparison result; and
sending said comparison result to said client system as a response to said request.

27. The non-transitory machine readable medium of claim 26, said actions further comprising:
determining that a second value exists for said key in one of said first XML data and said second XML data,
wherein said retrieving retrieves a third set of rows and a fourth set of rows from said relational database having said second value corresponding to said key, wherein said third set of rows and said fourth set of rows are contained respectively in said first plurality of rows and said second plurality of rows,
wherein said examining examines said third set of rows and said fourth set of rows to form a second comparison result.

28. The non-transitory machine readable medium of claim said actions further comprising:
converting said first XML data and said second XML data into a corresponding first generic XML data and a second generic XML data, wherein said first generic XML data and said second generic XML data contains data values specified according to a pre-defined schema, wherein said pre-defined schema is different from a user-defined schema according to which said first XML data and said second XML data arc specified; and
creating a tabular data corresponding to said first XML data and second XML data based on said first generic XML data and said second generic XML data,
wherein said storing stores said tabular data in the form of said first plurality of rows corresponding to said first XML data and said second plurality of rows corresponding to said second XML data in said relational database.
wherein both of said first plurality of rows and said second plurality of rows are stored in a same table of said relational database.

29. The non-transitory machine readable medium of claim 26, wherein said first XML data and said second XML data comprises a plurality of elements,
said storing to further store said first plurality of rows in the form of a plurality of columns in said relational database.
wherein said storing Mores each element having sub-elements in a corresponding row in said relational database, and the corresponding sub-elements of only leaf type in a first column of said plurality of columns in the corresponding row, wherein a sub-element of leaf type docs not have further lower level elements.

30. The non-transitory machine readable medium of claim 27, said actions further comprising:
determining that a third value and a fourth value exists for said key such that said third value exists only in said first XML data and said fourth value exists only in said second XML data; and
forming a third comparison result and a fourth comparison result respectively based on a fifth set of rows and a sixth set of rows retrieved from said relational database. said first set of rows and said sixth set of rows respectively having said third value and said fourth value corresponding to said key, wherein said fifth set of rows and said sixth set of rows are contained respectively in said first plurality of rows and said second plurality of rows.

31. The non-transitory machine readable medium of claim 27, wherein said retrieving and said forming comprises:
executing a first SQL query to retrieve identifiers identifying said first set of rows;
generating a second SQL query by incorporating said identifiers such that said second SQL query is designed to retrieve and compare said first set of rows identified by said identifiers with corresponding ones of said second set of rows having same corresponding identifier; and
executing said second SQL query to form said comparison result,
wherein said at least one SQL query comprises said first SQL query and said second SQL query.

32. The non-transitory machine readable medium of claim 30, said actions further comprising displaying said comparison result, said second comparison result, said third comparison result, and said fourth comparison result on a display unit, and wherein said key is contained in a set of keys specified in a metadata.

33. A digital processing system for comparing very large data encoded in extended markup language (XML), said digital processing system comprising:
a memory to store instructions;
a processor to retrieve said instructions from said memory and execute the retrieved instructions, wherein execution of the retrieved instructions cause said digital processing system to perform the actions of:
receiving a request from a client system, said request specifying a first XML data and a second XML data for comparison:
storing said first XML data and said second XML data respectively in the form of a first plurality of rows and a second plurality of rows in a relational database;
retrieving a first set of rows and a second set of rows from said relational database having the same value corresponding to a key, wherein said first set of rows and said second set of rows are contained respectively in said first plurality of rows and said second plurality of rows; and forming a comparison result by examining said first set of rows and said second set of rows retrieved from said relational database, wherein said retrieving and said forming are performed by execution of at least one SQL (structured query language) query directed to said relational database, said at least one SQL query generating at least a portion of said comparison result; and sending said comparison result to said client system as a response to said request.

34. The digital processing system of claim 33, said actions further comprising:

determining that a second value exists for said key in one of said first XML data and said second XML data.

wherein said retrieving retrieves a third set of rows and a fourth set of rows from said relational database having said second value corresponding to said key, wherein said third set of rows and said fourth set of rows are contained respectively in said first plurality of rows and said second plurality of rows, wherein said examining examines said third set of rows and said fourth set of rows to form a second comparison result.

35. The digital processing system of claim 33, said actions further comprising:

convening said First XML data and said second XML data into a corresponding first generic XML data and a second generic XML data, wherein said first generic XML data and said second generic XML data contains data values specified according to a pre-defined schema, wherein said pre-defined schema is different from a user-defined schema according to which said first XML data and said second XML data are specified; and creating a tabular data corresponding to said first XML data and second XML data based on said first generic XML data and said second generic XML data, wherein said storing stores said tabular data in the form of said first plurality of rows corresponding to said first XML data and said second plurality of rows corresponding to said second XML data in said relational database, wherein both of said first plurality of rows and said second plurality of rows are stored in a same table of said relational database.

36. The digital processing system of claim 33, wherein said first XML data and said second XML data comprises a plurality of elements, said storing to further store said first plurality of rows in the form of a plurality of columns in said relational database.

wherein said storing stores each element having sub-elements in a corresponding row in said relational database, and the corresponding sub-elements of only leaf type in a first column of said plurality of columns in the corresponding row, wherein a sub-element of leaf type does not have further lower level elements.

37. The digital processing system of claim 34, wherein said retrieving and said forming comprises:

executing a first SQL query to retrieve identifiers identifying said first set of rows, generating a second SQL query by incorporating said identifiers such that said second SQL query is designed to retrieve and compare said first set of rows identified by said identifiers with corresponding ones of said second set of rows having same corresponding identifier; and executing said second SQL query to form said comparison result, wherein said at least one SQL query comprises said first SQL query and said second SQL query.

38. The digital processing system of claim 34, said actions further comprising:

determining that a third value and a fourth value exists, for said key such that said third value exists only in said first XML data and said fourth value exists only in said second XML data; and forming a third comparison result and a fourth comparison result respectively based on a fifth set of rows and a sixth set of rows retrieved from said relational database, said first set of rows and said sixth set of rows respectively having said third value and said fourth value corresponding to said key. wherein said fifth set of rows and said sixth set of rows are contained respectively in said first plurality of rows and said second plurality of rows.

39. The digital processing system of claim 35, said actions further comprising displaying said comparison result, said second comparison result, said third comparison result, and said fourth comparison result on a display unit, and wherein said key is contained in a set of keys specified in a metadata.

* * * * *

UNITED STATES PATENT AND TRADEMARK OFFICE
CERTIFICATE OF CORRECTION

| | | |
|---|---|---|
| PATENT NO. | : 8,639,709 B2 | |
| APPLICATION NO. | : 12/016246 | |
| DATED | : January 28, 2014 | |
| INVENTOR(S) | : Mathur et al. | |

It is certified that error appears in the above-identified patent and that said Letters Patent is hereby corrected as shown below:

In the Drawings:

On Sheet 3 of 23, in figure 3, under Reference Numeral 360, line 1, delete "the the" and insert -- the --, therefor.

In the Specification:

In column 5, line 32, delete "incase" and insert -- in case --, therefor.

In column 14, line 17, delete ""Terems B"," and insert -- "Terms B", --, therefor.

In column 16, line 5, delete ""3"" and insert -- "3" --, therefor.

In the Claims:

In column 21, line 29, in Claim 6, delete "claim 5," and insert -- claim 2, --, therefor.

In column 25, line 21, in Claim 26, delete "key. wherein" and insert -- key, wherein --, therefor.

In column 25, line 48, in Claim 28, delete "claim" and insert -- claim 26, --, therefor.

In column 25, line 57, in Claim 28, delete "data arc" and insert -- data are --, therefor.

In column 25, line 64, in Claim 28, delete "database." and insert -- database, --, therefor.

In column 26, line 5-6, in Claim 29, delete "database." and insert -- database, --, therefor.

Signed and Sealed this
Twenty-fourth Day of June, 2014

Michelle K. Lee
*Deputy Director of the United States Patent and Trademark Office*

CERTIFICATE OF CORRECTION (continued)
U.S. Pat. No. 8,639,709 B2

In column 26, line 7, in Claim 29, delete "Mores" and insert -- stores --, therefor.

In column 26, line 11, in Claim 29, delete "docs" and insert -- does --, therefor.

In column 26, line 22, in Claim 30, delete "database. said" and insert -- database, said --, therefor.

In column 26, line 58, in Claim 33, delete "comparison:" and insert -- comparison; --, therefor.

In column 27, line 14, in Claim 34, delete "data." and insert -- data, --, therefor.

In column 27, line 27, in Claim 35, delete "convening said First" and insert -- converting said first --, therefor.

In column 28, line 5-6, in Claim 36, delete "database." and insert -- database, --, therefor.

In column 28, line 15, in Claim 37, delete "rows," and insert -- rows; --, therefor.

In column 28, line 27, in Claim 38, delete "exists, for" and insert -- exists for --, therefor.

In column 28, line 36, in Claim 38, delete "key. wherein" and insert -- key, wherein --, therefor.

In column 28, line 39, in Claim 39, delete "claim 35," and insert -- claim 38, --, therefor.